United States Patent [19]

Iwamura et al.

[11] Patent Number: 5,732,058
[45] Date of Patent: Mar. 24, 1998

[54] OPTICAL DISK CARTRIDGE AND AN OPTICAL DISK DRIVE USING THE SAME

[75] Inventors: Yasumasa Iwamura; Mineo Moribe; Kenichi Itoh, all of Kawasaki, Japan

[73] Assignee: Fujitsu Limited, Kawasaki, Japan

[21] Appl. No.: 724,853

[22] Filed: Oct. 3, 1996

Related U.S. Application Data

[63] Continuation of Ser. No. 480,732, Jun. 7, 1995, abandoned, which is a continuation of Ser. No. 96,175, Jul. 19, 1993, abandoned.

[30] Foreign Application Priority Data

Oct. 15, 1992 [JP] Japan ................. 4-277536

[51] Int. Cl.⁶ ................. G11B 33/02; G11B 15/60
[52] U.S. Cl. ................. 369/75.2
[58] Field of Search ................. 360/133; 369/75.2, 369/77.2, 291, 292, 77.1, 75.1

[56] References Cited

U.S. PATENT DOCUMENTS

| | | |
|---|---|---|
| 3,730,602 | 5/1973 | Campbell et al. . |
| 3,951,264 | 4/1976 | Heidecker et al. . |
| 4,817,079 | 3/1989 | Covington . |
| 4,928,271 | 5/1990 | Verhagen ................. 369/292 |
| 5,140,489 | 8/1992 | Barnard ................. 369/77.2 |
| 5,175,726 | 12/1992 | Imokawa ................. 369/291 |
| 5,212,683 | 5/1993 | VanHeusden et al. ................. 369/291 |
| 5,280,403 | 1/1994 | Martin ................. 360/133 |

FOREIGN PATENT DOCUMENTS

| | | |
|---|---|---|
| 2 217 229 | 9/1974 | France . |
| 2453154 | 5/1976 | Germany . |
| 2939609 | 4/1981 | Germany . |
| 53-106001 | 9/1978 | Japan . |
| 61-158675 | 10/1986 | Japan . |
| 63-311679 | 12/1988 | Japan . |
| 3-283065 | 12/1991 | Japan . |
| 2103863 | 2/1983 | United Kingdom ................. 369/75.2 |
| 2106696 | 4/1983 | United Kingdom . |

OTHER PUBLICATIONS

Patent Abstracts of Japan, vol. 16, No. 131 (P-1332) 3 Apr. 1992 of JP-A-03 292691 (Ricoh Co. Ltd.) 24 Dec. 1991.
Patent Abstracts of Japan, vol. 12, No. 345 (P-759) 16 Sep. 1988 of JP-A-63 102065 (Teac Co.) 6 May 1988.
Patent Abstracts of Japan, vol. 14, No. 504 (P-1127) 5 Nov. 1990 of JP-A-02 208864 (Canon Inc.) 20 Aug. 1990.

*Primary Examiner*—Stuart S. Levy
*Assistant Examiner*—George J. Letscher
*Attorney, Agent, or Firm*—Armstrong, Westerman, Hattori, McLeland & Naughton

[57] ABSTRACT

An optical disk cartridge includes a cartridge body formed with an opening at an edge thereof such that an optical disk can be taken out and returned from and to the optical disk cartridge. The opening is closed by a cover lid that is formed as an integral body of the cartridge body.

3 Claims, 51 Drawing Sheets

$t_{10}$ : 0.3mm $t_{11}$ : SEVERAL mm $h_{10} < h_1$
$h_{11} < h_2$

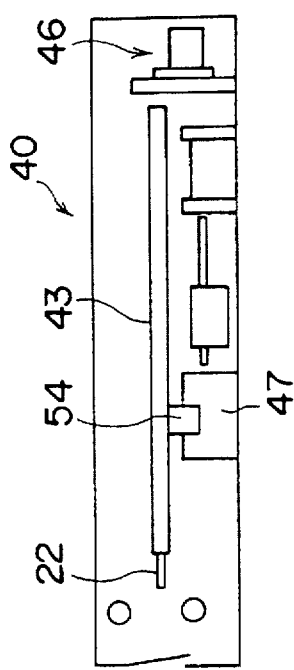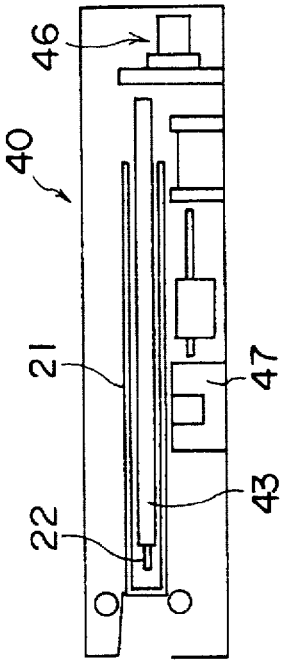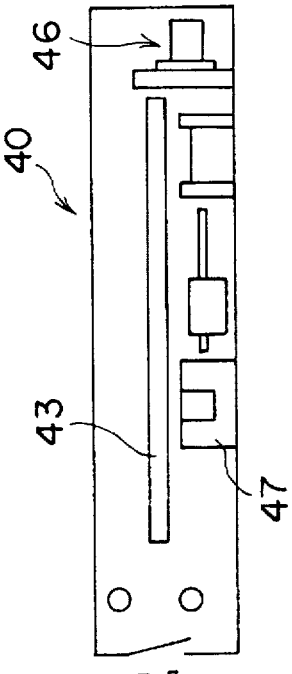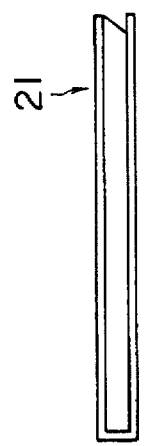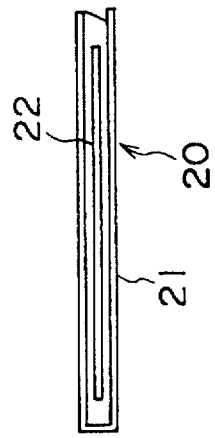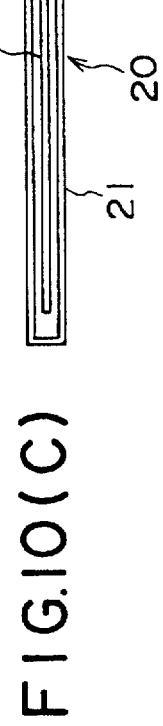
FIG.10(A)  FIG.10(B)  FIG.10(C)

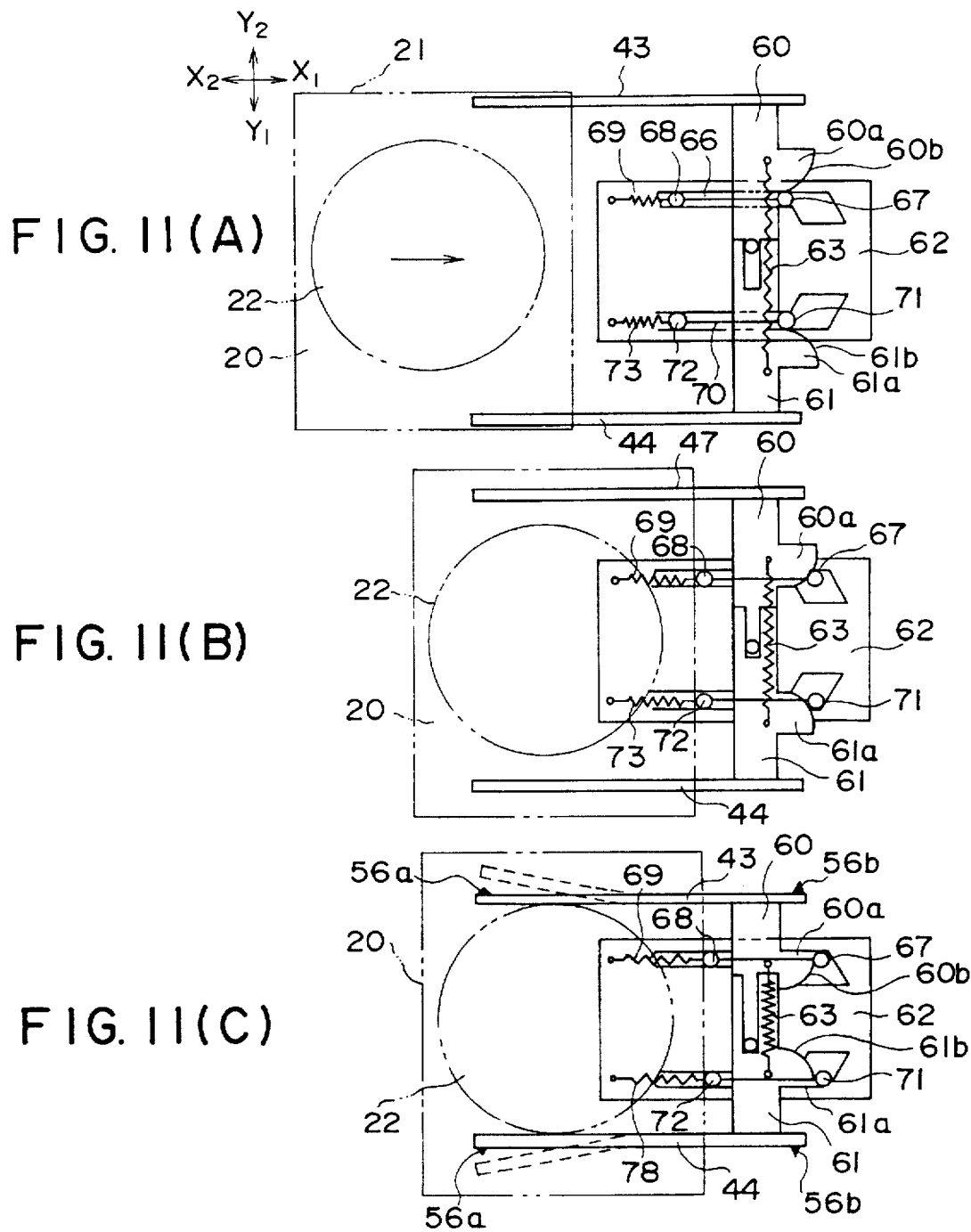

F I G. 14 (A)
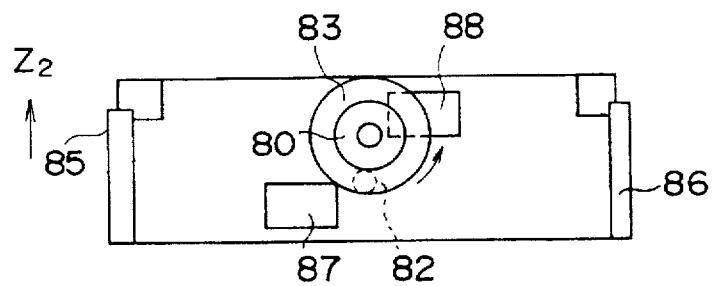
F I G. 14 (B)
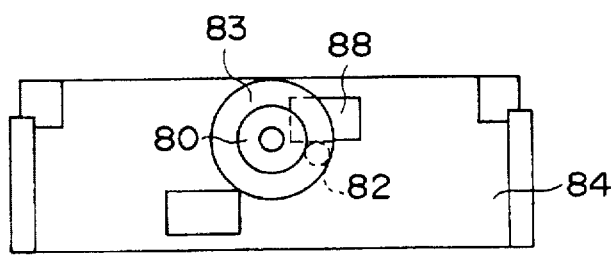
F I G. 14 (C)
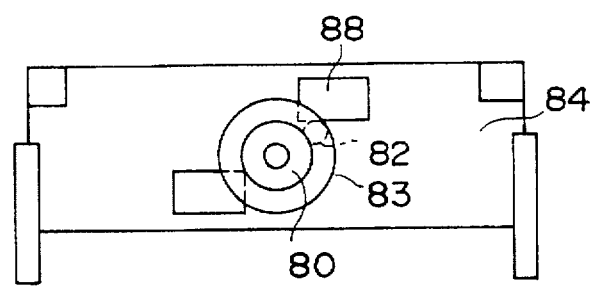
F I G. 14 (D)
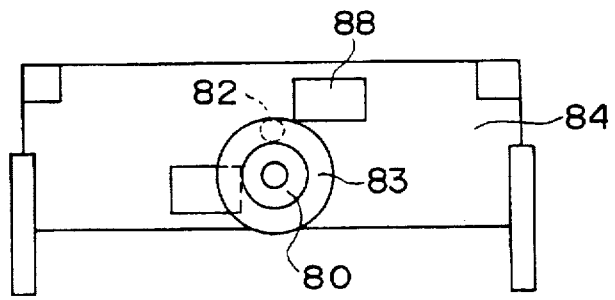

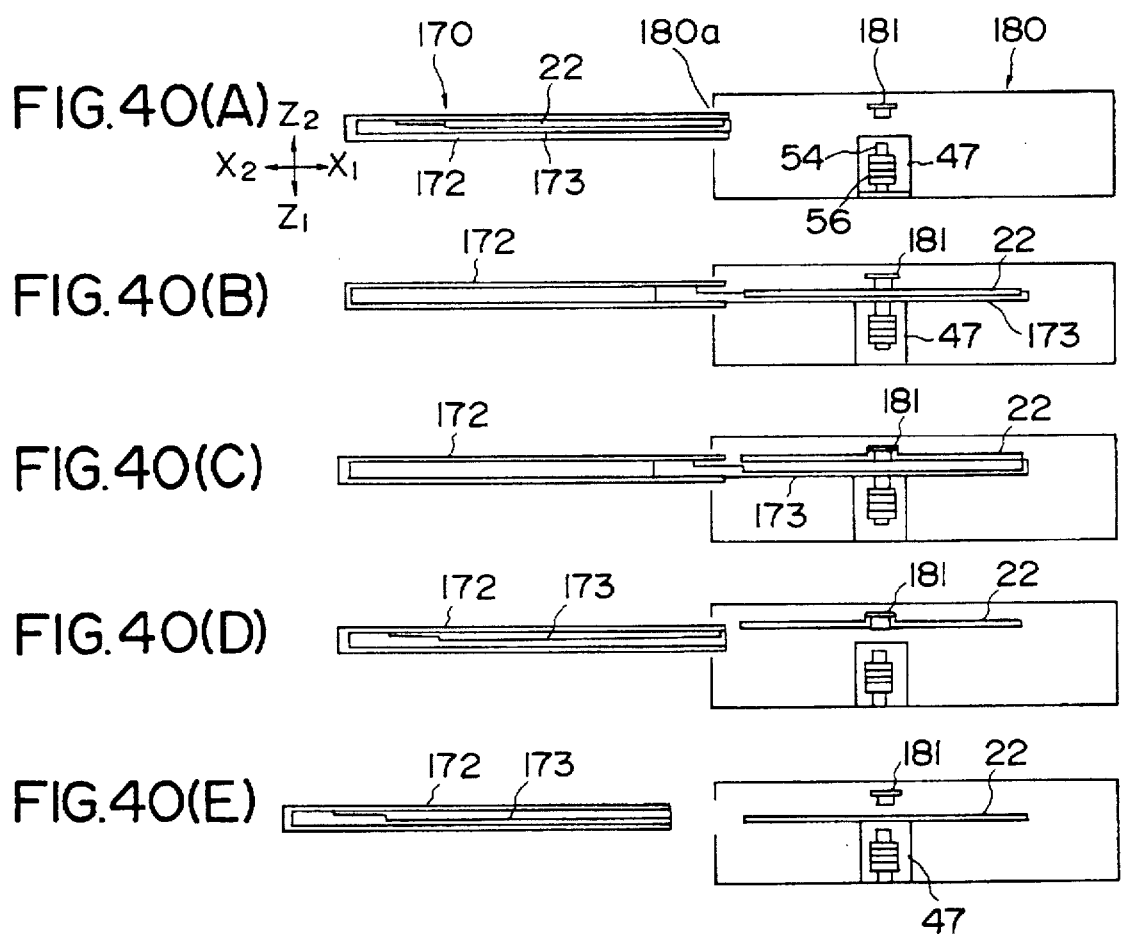

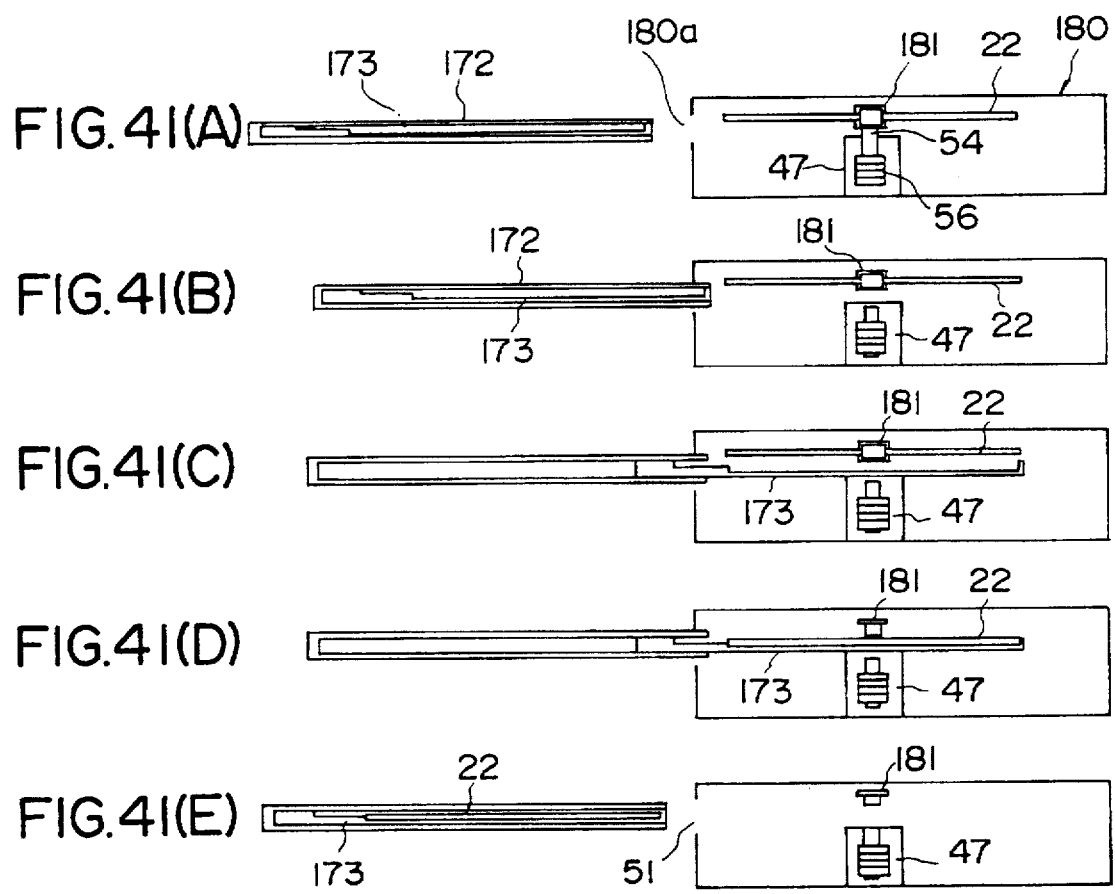

$X_2 \longleftrightarrow X_1$ $X_2 \longleftrightarrow X_1$ $X_2 \longleftrightarrow X_1$

OPTICAL DISK CARTRIDGE AND AN OPTICAL DISK DRIVE USING THE SAME

This application is a continuation of application Ser. No. 08/480,732, filed Jun. 7, 1995, now abandoned, which is a continuation of application Ser. No. 08/096,175, filed Jul. 19, 1993, now abandoned.

BACKGROUND OF THE INVENTION

The present invention generally relates to optical disk drives for reproducing information from an optical disk, and more particularly to an optical disk cartridge for accommodating an optical disk therein and an optical disk drive for reproducing information from the optical disk accommodated in the optical disk cartridge.

With wide spread use of optical disk drives in various fields of society, there is a demand to reduce the size of the optical disk drive particularly with respect to the height. In order to achieve the desired reduction in height of the optical disk drive, attempts are being made to reduce the thickness of the optical disk cartridge as much as possible.

FIG. 1 shows a typical conventional optical disk cartridge 1, wherein the cartridge 1 includes a body 3 in which an optical disk 4 is accommodated. In the cartridge 1 of FIG. 1, the body 3 is provided with a shutter mechanism 2 for protecting the optical disk 4 from exposure when the cartridge 4 is placed outside an optical disk drive.

FIG. 2 shows a conventional optical disk drive 10 that uses the cartridge 1 of FIG. 1.

Referring to FIG. 2, the optical disk drive 10 includes a case 11 in which a cartridge loading member 12, a cartridge loading mechanism 13, a spindle 14 and an optical head 15 are provided, wherein the cartridge loading member 12 and the cartridge loading mechanism 13 are moved between a non-loaded state shown in FIG. 2 by a two-dotted line and a loaded state shown also in FIG. 2 by a continuous line.

When loading the cartridge 1 on the disk drive 10, the cartridge 1 opens a cover lid 16 provided on the case 11 in correspondence to a cartridge insertion opening, by pushing the lid 16. Once the cartridge 1 is placed inside the case 11, the shutter 2 is opened and the body 3 of the cartridge 1 is held on the cartridge loading member 12. The cartridge loading member 12 then moves the cartridge 1 in a downward direction until the optical disk 4 engages with the spindle 14. In response to the engagement of the optical disk 4 with the spindle 14, the disk 4 is revolved within the cartridge body 3, and recording and reproduction of information is made on and from the disk 4 by means of the optical head 15.

In the conventional optical disk drive 10 of FIG. 2, it will be noted that the optical disk cartridge 1 remains within the disk drive 10 when the optical disk 4 is loaded thereon. In other words, the optical disk 4 revolves within the cartridge body 3 that in turn is held within the optical disk drive 10.

In order to avoid damage to the optical disk 4, the conventional disk cartridge 1 is formed to include a sufficient tolerance $t_0$ between the optical disk 4 and an inner surface 5 of the cartridge body 3, wherein the inner surface 5 faces the major surface of the optical disk 5. Typically, the tolerance $t_0$ forms gaps 8 and 9 each having a value of 1–2 mm above and below the disk 4 when the optical disk 4 is located at a central level of an inner space 6 defined within the cartridge body 3.

It should be noted that existence of the gaps 8 and 9 inevitably increases the overall thickness of the optical disk cartridge 1. In addition, the shutter 2 increases the effective thickness of the cartridge 1. As a result, the conventional cartridge 1 typically has a thickness $t_1$ of about 6 mm. The cartridge 1 held within the optical disk drive 10 with such a substantial thickness $t_1$ inevitably increases the height of the optical disk drive 10. For example, the optical disk drive 10 requires to have a space having a height $h_1$ of about 18 mm in order to load and unload the optical disk cartridge 1. It should be noted that such loading and unloading of the optical disk cartridge 1 involve vertical movement of the cartridge 1. Associated with the increased vertical size $h_1$, the conventional optical disk drive 10 inevitably has an increased thickness $h_2$.

SUMMARY OF THE INVENTION

Accordingly, it is an object of the present invention to provide a novel and useful optical disk cartridge and an optical disk drive that uses the optical disk cartridge, wherein the aforementioned problems are eliminated.

Another and more specific object of the present invention is to provide an optical disk cartridge having a minimum thickness and an optical disk drive that uses such an optical disk cartridge.

Another object of the present invention is to provide an optical disk cartridge comprising: a cartridge body defined with a space for accommodating an optical disk therein, said cartridge body having two mutually opposing major surfaces and surrounded laterally by a side edge; an optical disk removably accommodated within said space of said cartridge body such that major surfaces of said optical disk faces corresponding one of said major surfaces of said cartridge body, said optical disk storing therein information such that said information is stored in a form readable by optical means; an opening provided on said cartridge body in correspondence to said side edge for allowing said optical disk to be inserted into said space and to be removed therefrom freely; and a movable lid member provided on said cartridge body to form an integral member therewith such that said lid member movably closes said opening.

Another object of the present invention is to provide an optical disk cartridge comprising: a cartridge body having upper and lower major surfaces, said cartridge body including an upper flexible sheet forming said upper major surface and a lower flexible sheet forming said lower major surface, said upper and lower flexible sheets being connected with each other in correspondence to three of four lateral edges; and an optical disk accommodated in said cartridge body for storing information such that said information is stored in a form readable by optical means; said remaining edge of said cartridge body being opened so as to allow insertion and removal of said optical disk in and out of said cartridge body.

Another object of the present invention is to provide an optical disk cartridge, comprising: a cartridge body having two, mutually opposing major surfaces, said cartridge body being surrounded by a lateral edge, wherein a part of said lateral edge is formed with an opening; a tray movably accommodated in said cartridge body such that said tray is moved in and out of said cartridge body through said opening, said tray having a major surface that is formed with a depression for accommodating an optical disk; and an optical disk held removably in said depression.

Another object of the present invention is to provide an optical disk drive adapted for reading information from an optical disk that is accommodated in a cartridge in a state removable therefrom, said optical disk drive comprising: guide means for guiding said cartridge upon loading on said optical disk drive; catching means for catching selectively said optical disk upon loading of said cartridge on said optical disk drive such that said cartridge can be removed selectively and freely from said optical disk drive; driving means for causing said optical disk to revolve within said optical disk drive; and optical head means for reading information from said optical disk by means of a finely focused optical beam.

According to the foregoing features of the present invention, one can reduce the thickness of the optical disk cartridge, as the optical disk is no longer driven inside the cartridge when used in the optical disk drive. It should be noted that the cartridge body of the optical disk cartridge is removed from the optical disk drive once the optical disk is mounted on the disk drive. In other words, the optical disk alone is held inside the optical disk drive when the reading and/or writing of information is conducted on the optical disk drive. Thereby, the need for providing a tolerance inside the disk cartridge for avoiding contact between the cartridge body and the revolving optical disk is eliminated and one can reduce the thickness of the optical disk cartridge and hence the optical disk drive.

Other objects and further features of the present invention will become apparent from the detailed description when read in conjunction with the attached drawings.

BRIEF DESCRIPTION OF THE DRAWINGS

FIGS. 10(A)–10(C) are diagrams showing the unloading operation of the optical disk in the optical disk drive of FIG. 5;

FIGS. 11(A)–11(C) are diagrams showing the catching of the optical disk in the optical disk drive of FIG. 5;

FIGS. 14(A)–14(D) are diagrams showing the ascent of the optical disk in the optical disk drive of FIG. 5;

FIGS. 40(A)–40(E) are diagrams showing the loading of the optical disk in the optical disk drive of FIG. 39;

FIGS. 41(A)–41(E) are diagrams showing the unloading of the optical disk from the optical disk drive of FIG. 39;

DETAILED DESCRIPTION OF THE PREFERRED EMBODIMENTS

Figure 3:
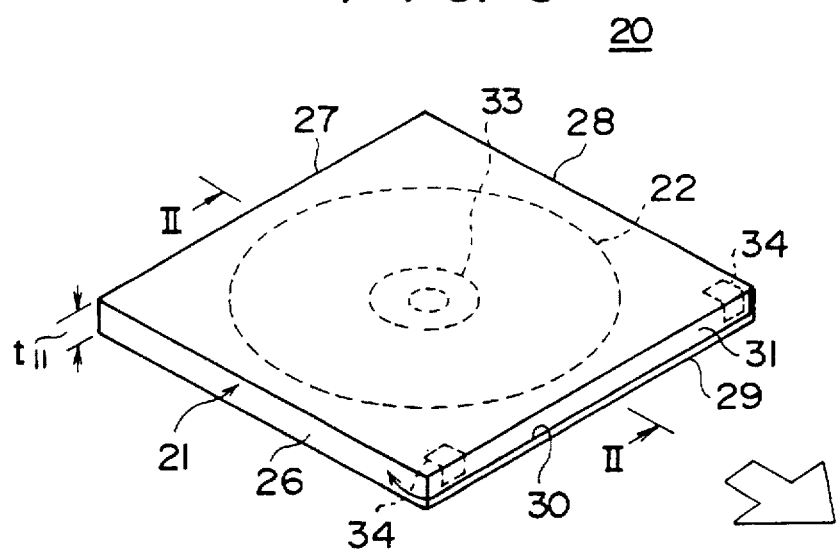
FIG. 3 is a diagram showing an optical disk cartridge according to a first embodiment of the present invention in a perspective view.
Figure 4:
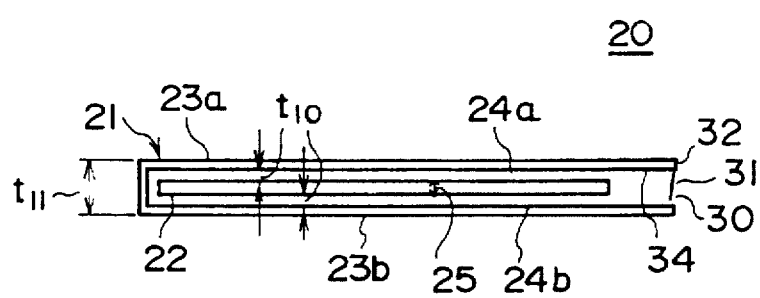
FIG. 4 is a diagram showing the optical disk cartridge of FIG. 3 in a cross sectional view.

FIG. 3 shows an optical disk cartridge 20 according to a first embodiment of the present invention and FIG. 4 shows a cross sectional view of the same optical disk cartridge.

Referring to FIGS. 3 and 4, the cartridge 20 includes a cartridge body 21 that is formed with an internal space 25 for accommodating an optical disk 22 that includes a central hub 33 as shown in the perspective view of FIG. 3. Further, as shown in the cross sectional view of FIG. 4, the optical disk 22 is separated from an upper wall 23a of the cartridge body 21 by a gap 24a and from a lower wall 23b of the same cartridge body 21 by a gap 24b, wherein the gap 24a and the gap 24b have a vertical size $t_{10}$. Further, a soft shock absorbing material 240 is provided to fill the gaps 24a and 24b such that upper and lower surfaces of the disk 22 contact the shock absorbing material 240 when the disk 22 is situated in the cartridge body.

Figure 1:
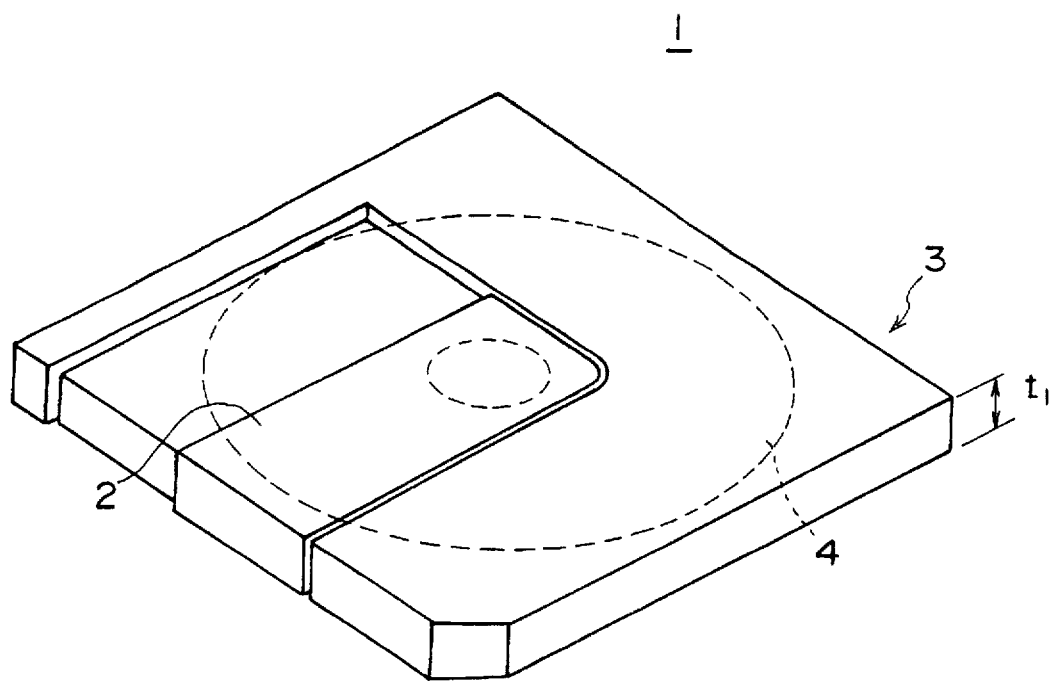
FIG. 1 is a diagram showing a conventional optical disk cartridge in a perspective view.
Figure 2:
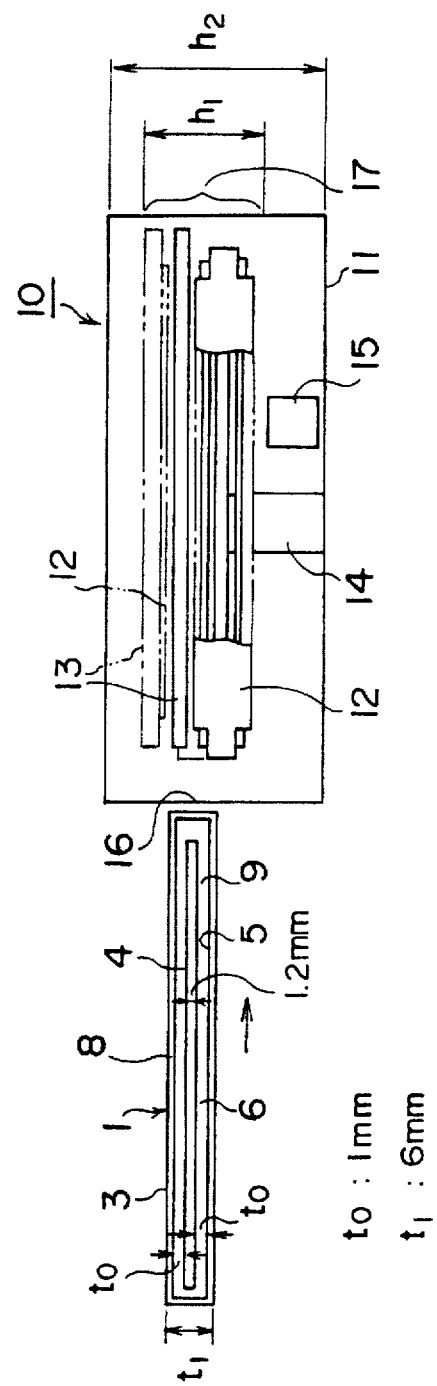
FIG. 2 is a diagram showing the optical disk cartridge of FIG. 1 together with a conventional optical disk drive that cooperates with the cartridge in a cross sectional view.

As will be explained in detail later, the cartridge body 21 is removed entirely from an optical disk drive once the optical disk 22 is mounted on the optical disk drive. In other words, the driving of the optical disk 22 to revolve at a high speed occurs outside the cartridge body 21. Thereby, the problem of the revolving optical disk being damaged by contacting to the cartridge body 21 does not exist in the cartridge 20 of the present embodiment, and one can reduce or minimize the gap formed between the optical disk and the cartridge body in the conventional optical disk cartridge for avoiding such an undesirable contact. Typically, one can reduce the height $t_{10}$ of the gap 24a or 24b to be about 0.3 mm. As a result of minimizing the height $t_{10}$ of the gaps 24a and 24b, one can minimize the height of the space 25 and hence the cartridge 20. Typically, the cartridge 20 of the present embodiment has a thickness $t_{11}$ of 3–4 mm. It should be noted that the thickness $t_{11}$ is smaller than the corresponding thickness $t_1$ of the conventional cartridge 1 (see FIG. 2) by several millimeters.

Referring to FIG. 3 again, it will be noted that the cartridge body 21 has a generally rectangular shape surrounded by side edges 26–29, wherein an opening 30 is provided in correspondence to one of the side edges 29. The rest of the side edges 26–28 are closed to form a continuous side wall. Further, in correspondence to opening 30, a movable lid 30 is provided to close the opening 30 in a normal state thereof. The upper and lower walls 23a and 23b of the cartridge body 21 form a continuous, closed wall in continuation to the side edges 26–28. In other words, no shutter mechanism for exposing the optical disk 22 is provided on any of the upper and lower walls 23a and 23b.

The cover lid 30 is provided on the cartridge body 21 as an integral body therewith and is urged to close the opening 30 by an L-shaped leaf spring 34. It should be noted that the cover lid 30 includes a flexible root part 32 fixed upon the cartridge body 21. Thereby, accidents such as the optical disk 22 falling from the cartridge 20 unwantedly are successfully eliminated.

Figure 5:
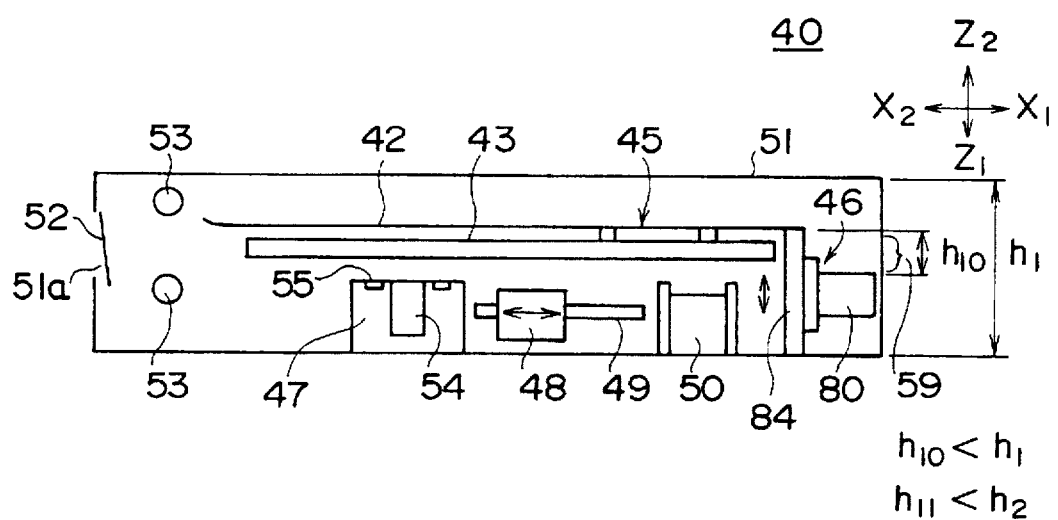
FIG. 5 is a diagram showing an optical disk drive that cooperates with the optical disk cartridge of FIG. 3 in a cross sectional view.

The cartridge 20 of FIG. 3 is loaded upon an optical disk drive by inserting the cartridge 20 in a direction shown by an arrow in FIG. 3, and FIG. 5 shows the construction of an optical disk drive 40 that is adapted to cooperate with the optical disk cartridge 20 of FIG. 5.

Referring to FIG. 5, the optical disk drive 40 includes a case 51 having a height $h_{11}$ in which a motor-driven spindle 47 is provided for driving the optical disk 22. The spindle 47 carries a magnet 55 on the top surface thereof such that the magnet holds the central hub 33 of the optical disk 33 by magnetic attraction when the optical disk is mounted on the optical disk drive 40.

As usual in the commonly used optical disk drives, the optical disk drive 40 of FIG. 5 includes a movable optical head 48 for producing a laser beam that is used for reading and/or writing information from and on the optical disk 22. It should be noted that the optical head 48 is held upon a guide rail 49 and is movable in a radial direction of the optical disk 22 as indicated by arrow in FIG. 5. Further, an optical detector 50 is provided for processing the output signal produced by the optical head 48. The optical head 48 and the optical detector 50 are provided upon the bottom part of the optical disk drive 40, and the laser beam produced by the optical head 48 irradiates the lower major surface of the optical disk 22 revolving in the optical disk drive 40.

In order to load the optical disk 22 upon the disk drive 40, the case 51 of the optical disk drive 40 is provided with an opening 51a covered by a cover lid 52 in correspondence to a front part thereof, wherein the cover lid 52 is urged by a spring (not illustrated) to close the opening 51a in a normal state.

When loading the optical disk cartridge 40 of FIG. 3 upon the optical disk drive 40, the cartridge 40 is inserted in a $X_1$-direction shown by an arrow in FIG. 3, and the cartridge 40 urges the cover lid 52 to open by engaging with the same. The cartridge 40 thus inserted into the opening 51a is accepted by guide rollers 53 provided behind the opening 51a and is guided further along a guide member 42. Further, there are provided a pair of guide rods 43 and 44 to extend along the guide member 42, and a catch mechanism 45 catches the optical disk 22 as will be described later in detail. Further, the guide rods 43 and 44 are formed as a unitary body with a slidable member 84 that in turn is held movable in a vertical direction ($Z_1$ and $Z_2$) by an elevating mechanism 46 for a distance $h_{10}$. It should be noted that the slidable member 84 is moved by a drive motor 80 that forms a part of the elevating mechanism 46. In addition, a solenoid-actuated rod 54 for pushing the optical disk 22 in the vicinity of the hub 33 in an upward direction ($Z_2$) is provided adjacent to the spindle 47 for disengaging the magnetic coupling between the hub 33 of the optical disk 22 and the magnet 55 on the spindle. The rod 54 is used when unloading the optical disk 22 from the optical disk drive 40.

Figure 6:
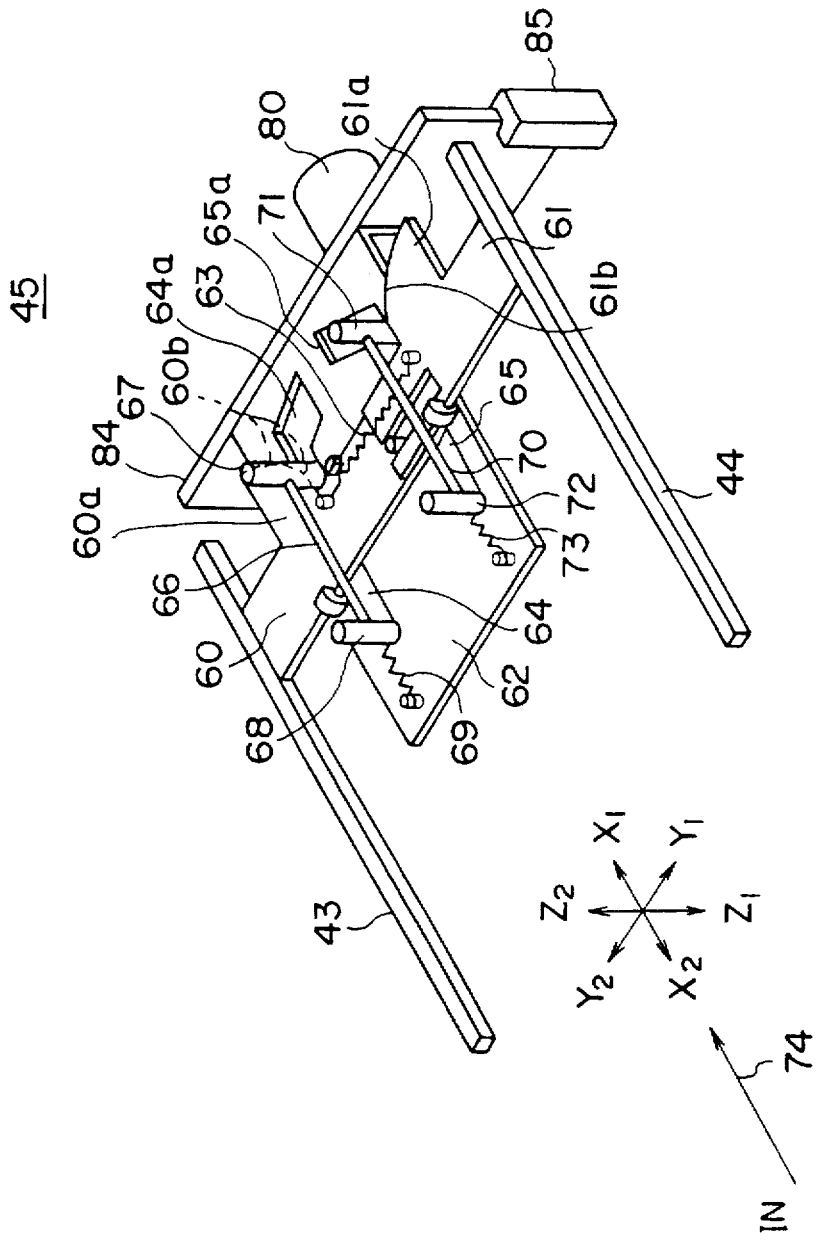
FIG. 6 is a diagram showing a mechanism provided inside the optical disk drive of FIG. 5.

FIG. 6 shows the catching mechanism 45 in detail.

Referring to FIG. 6, the mechanism 45 includes the foregoing guide rods 43 and 44 extending parallel with each other in the $X_1$-$X_2$ direction, wherein the rod 43 is connected rigidly to a plate member 60 while the rod 44 is connected rigidly to another plate member 61. The plate member 60 and the plate member 61 are held movable from each other on a stage 62 that in turn is connected rigidly to the slidable member 84, and the slidable member 84 is held slidable upon a guide member 85 and another guide member 86 (not shown in FIG. 6) that are both fixed upon the case 51. In FIG. 6, it should be noted that the plate member 60 and the plate member 61 overlap with each other on the stage 62.

It should be noted that the plate member 60 and the plate member 61 are connected resiliently by a spring 63 that exerts a force to attract the plate member 60 and the plate member 61 with each other, wherein the plate member 60 is provided with a stopper part 60a having a semi-circular guide surface 60b as shown in FIG. 6 by a broken line. Similarly, the plate member 61 is provided with a stopper part 61a having a semi-circular guide surface 61b as shown in FIG. 6. Further, the plate forming the stage 62 is formed with cutouts 64a and 65a wherein the cutout 64a accommodates a pin 67 while the cutout 65a accommodates another pin 71. Thereby, excessive movement of the movable plate member 60 toward the movable plate member 61 is prevented by the pin 67 that establishes an engagement with the plate member 60. Similarly, excessive movement of the movable plate member 61 toward the movable plate 60 is prevented by the pin 71 that establishes an engagement with the plate member 61.

Further, the pin 67 is urged in the $X_2$-direction by a spring 69 via a rod 66 and another pin 68 that is connected to the rod 66, wherein the pin 68 is provided movable in the $X_1$-$X_2$ direction along an elongate cutout 64 that extends in the stage 62 in the foregoing $X_1$-$X_2$ direction. Similarly, the pin 71 is urged in the $X_2$ direction by a spring 73 via a rod 70 and another pin 72 connected to the rod 70, wherein the pin 72 is provided movable in the $X_1$-$X_2$ direction along an elongate cutout 65 that extends in the stage 62 in the $X_1$-$X_2$ direction. It should be noted that the foregoing cutouts 64a and 65a are formed respectively at the end of the cutouts 64 and 65 in the $X_1$-direction. In fact, the cutout 64a forms a part of the cutout 64 that extends generally toward the $Y_1$-direction, while the cutout 65a forms a part of the cutout 64 that extends generally toward the $Y_2$-direction. Thereby, the cutouts 64a and 65a approach with each other. The function of the catching mechanism 45 will be explained in detail later.

Figure 7:
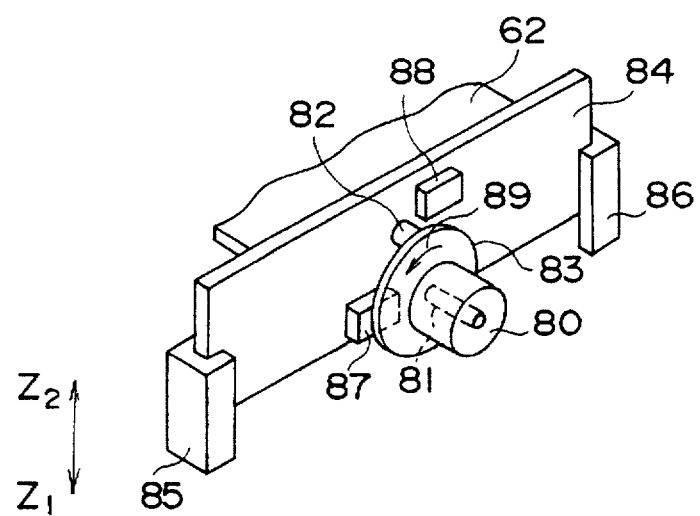
FIG. 7 is a diagram showing a part of the mechanism of FIG. 6 in detail.

FIG. 7 shows the elevating mechanism 46 in detail.

Referring to FIG. 7, it will be noted that the stage 62 is connected rigidly to the slidable member 84 and moves up and down together with the member 84 that is held slidably by the guide members 85 and 86. The slidable member 84 carries thereon projecting blocks 87 and 88, wherein the projecting blocks 87 and 88 are disposed so as to engage with a pin 82 that is carried on a rotary disc 83. The rotary disk 83 is provided on a spindle 81 of the motor 80 and the pin 82 urges the block 87 in the downward direction upon counterclockwise revolution of the disc 83. Similarly, the pin 82 urges the block 88 in the upward direction upon the counterclockwise revolution of the disc 83. In other words, continuous energization of the motor 80 to cause the counterclockwise revolution of the disc 83 in turn causes alternate up and down movement of the slidable member 84 and hence the stage 62 that is attached thereto.

FIGS. 8(A)–8(D) show the general operation of the optical disk drive 40 for loading the optical disk 22.

Figure 8A:
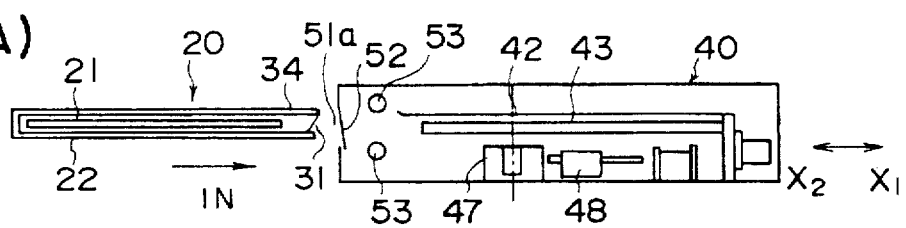
FIGS. 8(A)–8(D) are diagrams showing the loading operation of the optical disk in the optical disk drive of FIG. 5.
Figure 8B:
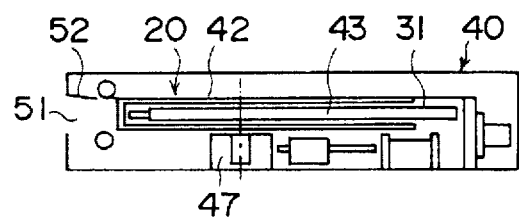
Figure 9:
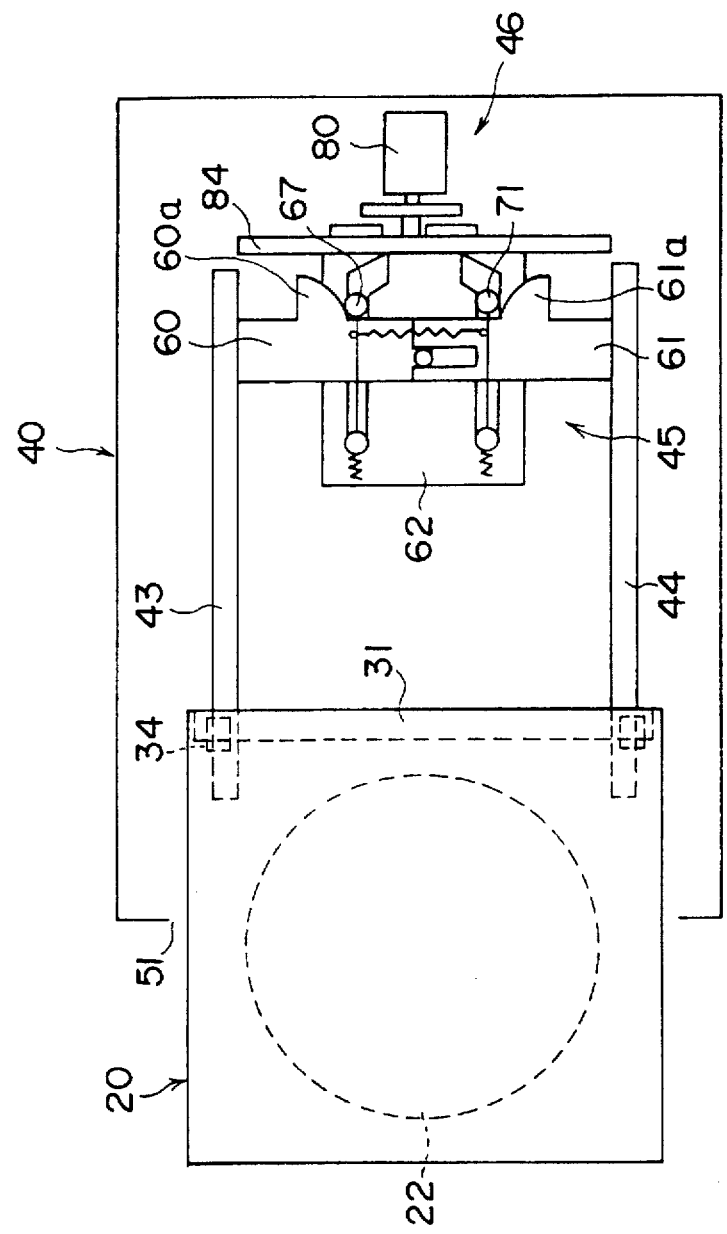
FIG. 9 is a plan view of the optical disk drive showing the state wherein the optical disk is about to be loaded.

Referring to FIG. 8(A), the optical disk cartridge 20 shown in FIG. 4 is inserted into the disk drive 40 via the opening 51a. There, the cartridge 20 pushes the lid 52 to open the passage, and the cartridge 20 is accommodated in the disk drive 40 as indicated in FIG. 8(B) via the opening 51a. The guide rods 43 and 44 enter into the cartridge 20 upon loading of the cartridge 20 into the disk drive 40, and the rods 43 and 44 push the lid 31 of the cartridge 20 as indicated in FIG. 9 such that the opening 30 is exposed. In the state shown in FIG. 8(B), the catching mechanism 46 is activated and the guide rods 43 and 44 engage with the optical disk 22 inside the cartridge 20. Thereby, the optical disk 22 is held by the guide rods 43 and 44.

Figure 8C:
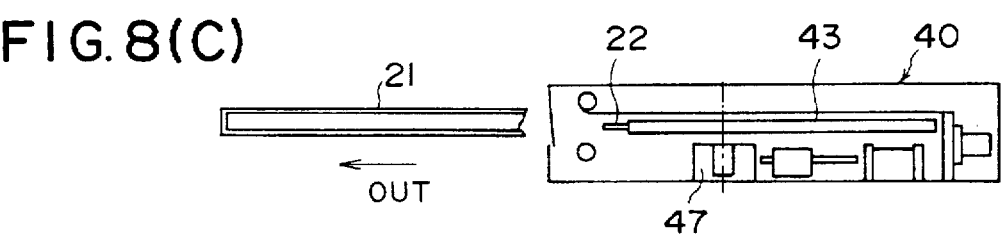

Next, in the step of FIG. 8(C), the cartridge body 21 is pulled out from the optical disk drive 40 while leaving the optical disk 22 inside the disk drive 40. Further, in the step of FIG. 8(D), the elevating mechanism 46 is activated and the optical disk 22 is lowered together with the slidable member 84. When the disk 22 is fully lowered, the hub 33 of the disk 22 is held upon the spindle 47 by the action of the magnet 55. Further, the catching mechanism 45 returns to the original state and the optical disk 22 is released from engagement such that the optical disk 22 revolves freely together with the spindle 47.

Next, the operation for removing the optical disk 22 from the optical disk drive 40 will be described with reference to FIGS. 10(A)–10(C). The process of removal of the optical disk 22 occurs generally in the manner opposite to the loading process of FIGS. 8(A)–8(D).

Referring to FIG. 10(A), the solenoid-activated rod 54 is actuated and the optical disk 22 is lifted away from the spindle 47 by breaking the magnetic coupling of the magnet 55. Further, the catching mechanism 45 is activated and the guide rods 43 and 44 holds the optical disk 22 by making mechanical engagement. Further, the rod 54 is lowered and the blank cartridge body 21 is inserted into the optical disk drive 40 as indicated in FIG. 10(B). Thereby, the optical disk 22 is accommodated inside the cartridge body 21 thus inserted. Further, the cartridge body 21 is pulled out from the optical disk drive 40 as indicated in FIG. 10(C), together with the optical disk 22 held inside the cartridge body 21.

In the foregoing operation of the optical disk drive 40, it will be noted that the cartridge body 21 does not move in the optical disk drive 40 in the vertical direction. Only the optical disk 22 moves in the vertical direction wherein the stroke of movement is limited to be approximately equal to the thickness of the hub 33. Thereby, the overall height $h_{11}$ of the optical disk drive 40 is substantially reduced. It should be noted that the space 59 for accommodating the optical disk cartridge 20 is required to have a minimum height for the height $h_{10}$ wherein the height $h_{10}$ is set equal to the thickness $t_{11}$ of the cartridge 22.

Next, the operation for catching and releasing the optical disk 22 by the catching mechanism will be described in detail with reference to FIGS. 11(A)–11(C).

Referring to FIG. 11(A) showing a situation corresponding to FIG. 9 described before, the optical disk cartridge 20 is inserted into the optical disk drive 40 such that the guide rods 43 and 44 enter into the cartridge body 21. In this state, the pins 67 and 71 are in the fully retracted state by the urging force of the springs 69 and 73.

With further insertion of the cartridge 20 into the optical disk drive 40 as indicated in FIG. 11(B), the front edge of the cartridge body 21 engages with the pins 67 and 71, and the pins 67 and 71 are pushed in the $X_1$-direction. In response to the displacement of the pins 67 and 71, the plate members 60 and 61 are displaced to approach with each other as a result of the force exerted by the spring 63. Thereby, movement of the plate members 60 and 61 are restricted by the engagement of the stopper parts 60a and 61a with the pins 67 and 71. It should be noted that the stopper parts 60a and 61a are formed with the guide surfaces 60b and 61b respectively for engagement with the pins 67 and 71. In response to the displacement of the plate members 60 and 61, the guide rods 43 and 44 approach with each other in the lateral direction ($Y_1$–$Y_2$-direction) and establish a mechanical engagement with the optical disk 22 held inside the cartridge body 21 as indicated in FIG. 11(C).

Once the optical disk 22 is thus held by the guide rods 43 and 44, the cartridge body 21 is pulled out from the optical disk drive 40, leaving the optical disk 22 inside the optical disk drive 40. Thereby, the pins 67 and 71 are held in the state shown in FIG. 11(C) in correspondence to the engagement with a tip end part of the stopper members 60a and 61a wherein the guide surfaces 60b and 61b form an edge extending generally in the $Y_1$–$Y_2$-direction.

Further, the optical disk 22 is lowered together with the guide rods 43 and 44 as shown in FIG. 11(C) as a result of activation of the elevating mechanism 46. Thereby, electrodes 56a and 56b provided movable on the guide rodes 43 and 44 are supplied with a drive current such that the drive current flows through the guide rods 43 and 44. Thereby, the guide rods 43 and 44, formed of a shape memory alloy, curves away from each other upon heating by the drive current in the direction shown in FIG. 11(C) by arrows. Thereby, free revolution of the optical disk 22 becomes possible.

Figure 12A:
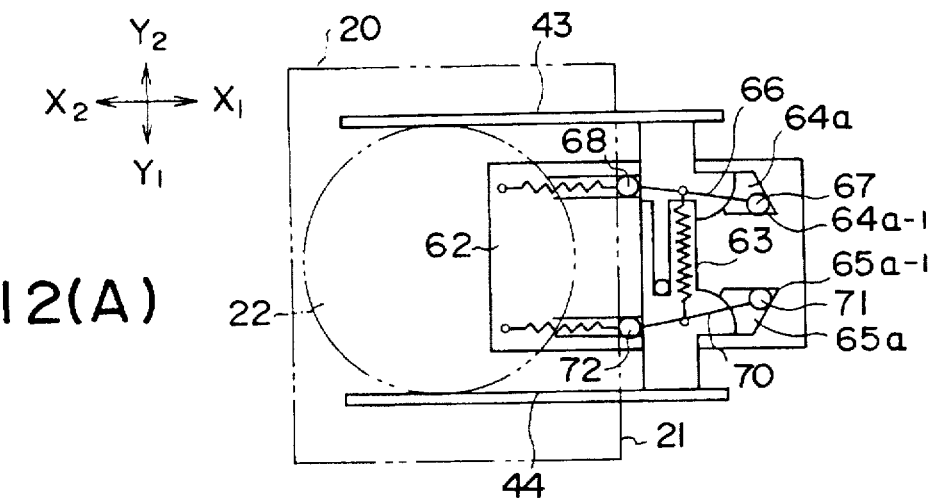
FIGS. 12(A)–12(C) are diagrams showing the cancellation of catching the optical disk in the optical disk drive of FIG. 5.
Figure 12B:
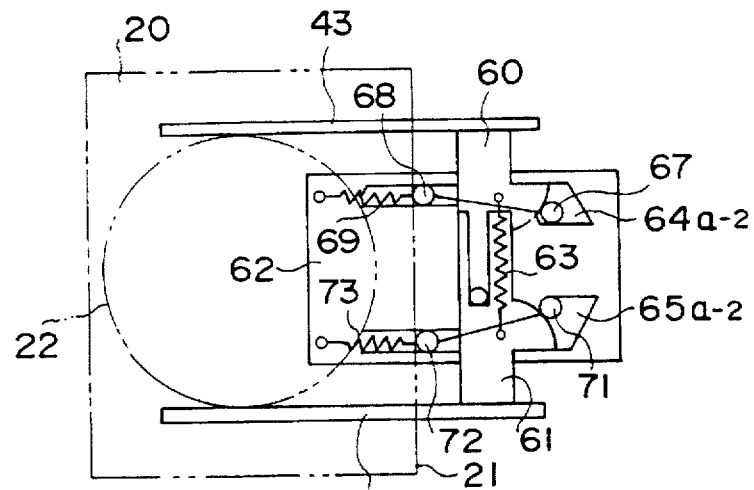

When removing the optical disk 22 from the optical disk drive 40, the optical disk 22 held by the guide rods 43 and 44 are lifted to the position shown in FIG. 10(A) as a result of activation of the elevating mechanism 46. Further, a blank cartridge body 21 is inserted into the optical disk drive 40 as indicated in FIG. 12(A) such that the optical disk 22 is accommodated in the cartridge body 21. Thereby, the front edge of the cartridge body 21 pushes the pins 67 and 71 as indicated in FIG. 12(A), and the pins 67 and 71 connected to the pins 67 and 71 are pushed respectively to positions $64a_{-1}$ and $65a_{-1}$ shown also in FIG. 12(A). It should be noted that, in the position shown in FIG. 12(A), the stationary engagement of the pins 67 and 71 with the flat part of the guide surfaces 60b and 61b as in the case of FIG. 11(C), is released. Further, with withdrawal of the cartridge body 21 from the optical disk drive 40 as indicated in FIG. 12(B), the pins 67 and 71 are displaced in the $X_2$ direction as a result of the urging force exerted by the springs 69 and 73. In response to the displacement of the pins 67 and 71, the plate members 60 and 61 are displaced laterally such that the plate members 60 and 61 separate from each other.

Figure 12C:
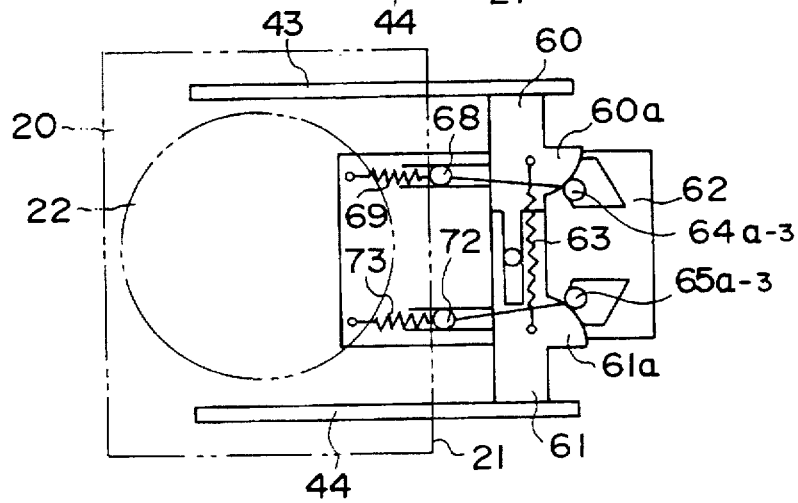

With further withdrawal of the cartridge body 21, the plate members 60 and 61 are separated with maximum distance as indicated in FIG. 12(C), and engagement of the optical disk 22 with the guide rods 43 and 44 is entirely released. Thereby, one can remove the optical disk 22 out of the optical disk drive 40 together with the cartridge body 21.

Figure 8D:
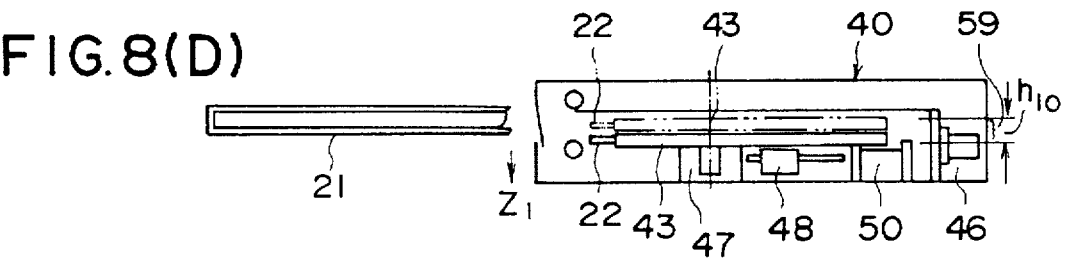
Figure 13A:
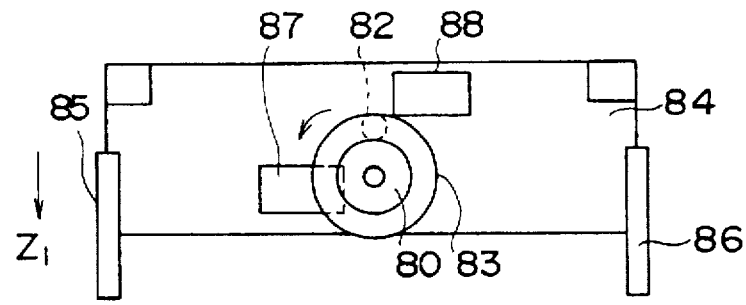
FIGS. 13(A)–13(D) are diagrams showing the descent of the optical disk in the optical disk drive of FIG. 5.
Figure 13B:
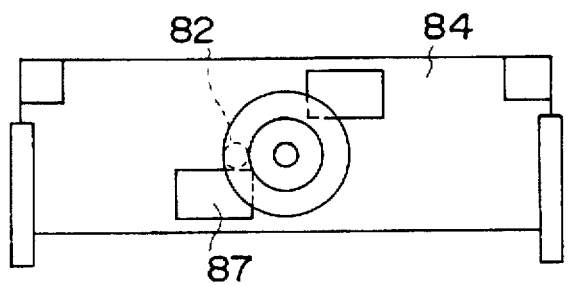
Figure 13C:
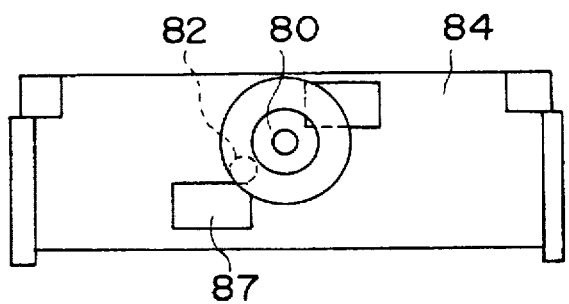
Figure 13D:
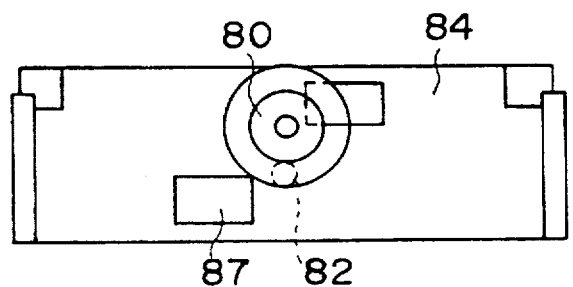

FIGS. 13(A)–13(D) show the decent of the slidable member 84 that occurs in correspondence to the step of FIG. 8(D). As indicated in FIG. 13(A), the motor 80 is driven such that the disc 83 is rotated in the counterclockwise direction and the pin 82 provided on the disc 83 engages with the block 87 as indicated in FIG. 13(B). With further activation of the motor 80, the pin 82 pushes the block 87 in the downward direction, and the slidable member 84 is lowered with respect to the guide members 85 and 86 as indicated in FIG. 13(C). When the member 84 is fully lowered, the engagement of the pin 82 with the block 87 is released as indicated in FIG. 13(D). With the decent of the member 84, the decent of the guide rods 43 and 44 occurs together with the optical disk 22 held therebetween, as explained previously.

FIGS. 14(A)–14(D) shows the ascent of the slidable member 84 that occurs before the step of FIG. 10(A).

Starting from the state of FIG. 14(A) that corresponds to the state of FIG. 13(D), the pin 82 engages with the block 88 provided on the slidable member 84 with further energization of the motor 80 in the counterclockwise direction as indicated in FIG. 14(B). Further, with further energization of the motor 80, the pin 82 pushes the block 88 in the upward direction as indicated in FIG. 14(C) such that the guide rods 43 and 44 are lifted in the upward direction together with the optical disk 22 held between the guide rods 43 and 44. When the disk 22 is fully lifted up, the engagement between the pin 82 and the block 88 is released as indicated in FIG. 14(D).

Figure 15:
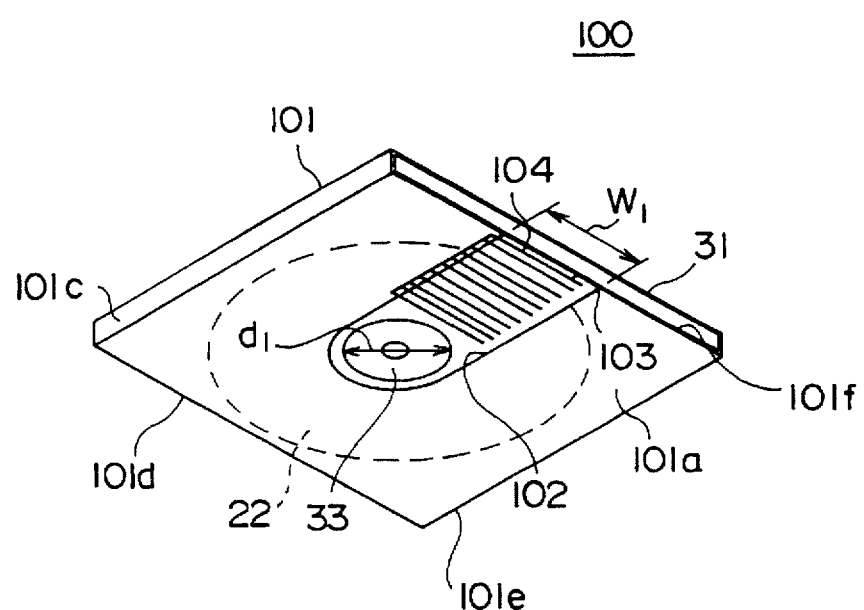
FIG. 15 is a diagram showing an optical disk cartridge according to a second embodiment of the present invention in a perspective view viewing from a lower direction.

Next, a second embodiment of the present invention will be described with reference to FIG. 15 showing an optical disk cartridge 100 in a perspective view viewed from a lower direction.

Referring to FIG. 15, the cartridge 100 includes a cartridge body 101 in which the optical disk 22 is accommodated. Similarly to the cartridge 20 of the first embodiment, the cartridge body 101 of the cartridge 100 includes a bottom surface 101a and an top surface 101b (cannot be seen in FIG. 15), and side walls 101c–101e surround the body 101 laterally except for a side edge 101f wherein an opening for allowing passage of the optical disk 22 is formed. Further, the foregoing opening 101f is closed by a cover lid 31 that is formed as an integral body with the cartridge body 101. Similarly to the cartridge 20 of the first embodiment, the cover lid 31 is urged by a spring corresponding to the spring 34 of FIG. 3 so as to close the opening unless urged externally. Further, there is provided a cutout 102 on the bottom surface 101a of the cartridge 100 such that the cutout 102 extends from the opening 101f toward the interior of the cartridge body 101 until the hub 33 of the optical disk 22 is exposed. There, the cutout 102 exposes the lower major surface of the optical disk 22 accommodated in the cartridge body 101, and a brush part 104 covers the exposed optical disk. It should be noted that the brush part 104 includes a number of fibrous brush wires 103 extending to close the cutout 102. Thereby, the brush part 104 minimizes penetration of dust into the cartridge body 101. Typically, the brush wires 103 are formed of soft fibrous material to avoid damaging to the optical disk 22. It should be noted that the cutout 102 has a width $W_1$ that is slightly larger than the diameter $d_1$ of the hub 33.

Figure 16:
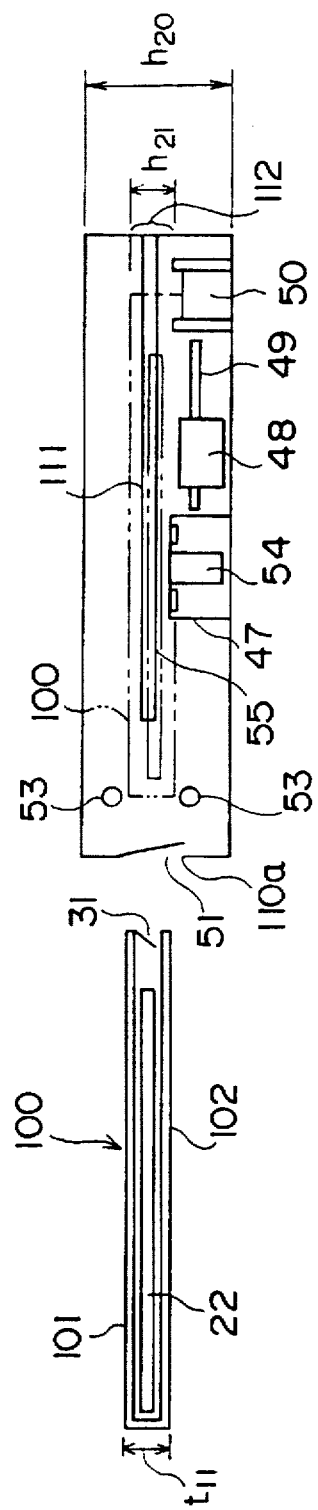
FIG. 16 is a diagram showing the optical disk cartridge of FIG. 15 and an optical disk drive that cooperates with the optical disk cartridge of FIG. 15.

FIG. 16 shows the construction of an optical disk drive 110 that is used for reading and/or writing information from and to the optical disk 22 that is accommodated in the cartridge 100 of FIG. 15. In FIG. 16, those parts described previously with preceding drawings are designated by the corresponding reference numerals, and the description thereof will be omitted.

Referring to FIG. 16, it will be noted that the optical disk drive 110 includes a rod 111 in alignment with an insertion opening 110a that corresponds to the opening 51a of FIG. 5, for opening the lid 31 of the cartridge 100, while the disk drive 110 lacks the catching mechanism 45 and the elevating mechanism 46. The rod 111 also acts as a guide rail for guiding the optical disk cartridge 100 that has been inserted into the disk drive 110.

The disk cartridge 100 is inserted and withdrawn to and from the optical disk drive 110, and the optical disk 22 is held inside the disk drive 110 similarly to the previous embodiment, except that the reading and/or writing of information from and to the optical disk 22 is achieved without descending or ascending the optical disk 22 within the disk drive 100. Thereby, the vertical height $h_{20}$ of the space in which the mounting of the optical disk 22 is achieved is substantially reduced and associated therewith, one can construct the optical disk drive 110 to have a reduced height $h_{21}$ as compared with the optical disk drive 20 of FIG. 5.

Figure 17A:
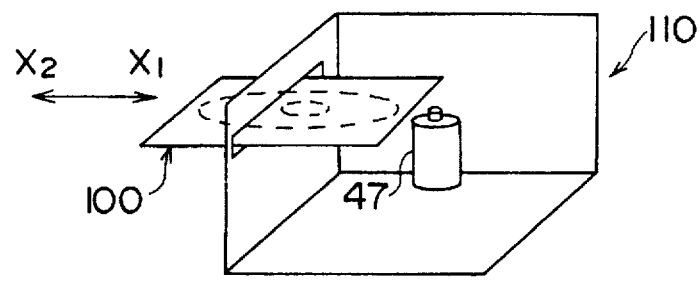
FIGS. 17(A)–17(D) are diagrams showing loading and unloading operation of the optical disk in the optical disk drive of FIG. 16.
Figure 17B:
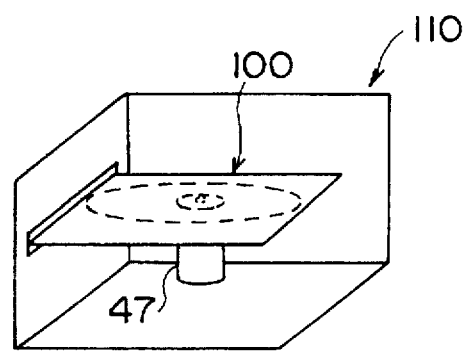

Next, the operation of the optical disk drive 110 will be described with reference to FIGS. 17(A)–17(D), wherein loading of the optical disk 22 starts with the step of FIG. 17(A) in which the optical disk cartridge 100 is inserted into the insertion opening 110a of the optical disk drive 110. There, the cartridge 100 is inserted in the $X_1$-direction. The cartridge 110 thus inserted is guided by the guide rollers 53 and the rod 111, and the spindle 47 of the disk drive 110 engages with the bottom surface 101a of the cartridge body 101 along the cutout 102 when the cartridge 100 is inserted in the $X_1$-direction. When the cartridge 100 is fully inserted into the disk drive 110 as indicated in FIG. 17(B), the spindle 47 engages with the hub 33 of the optical disk 22 and the hub 33 is fixed upon the spindle 47 by a magnet provided on the spindle 47 similarly to the magnet 55 of FIG. 5.

Figure 17C:
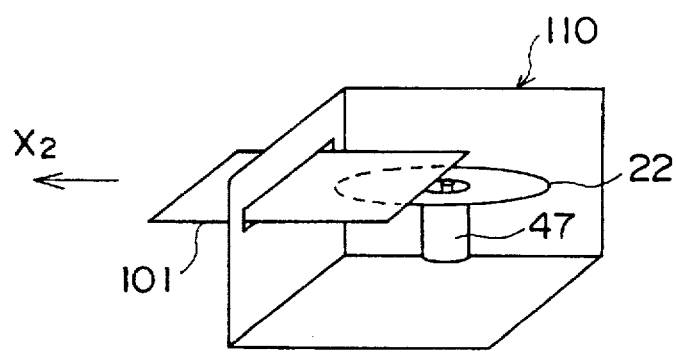
Figure 17D:
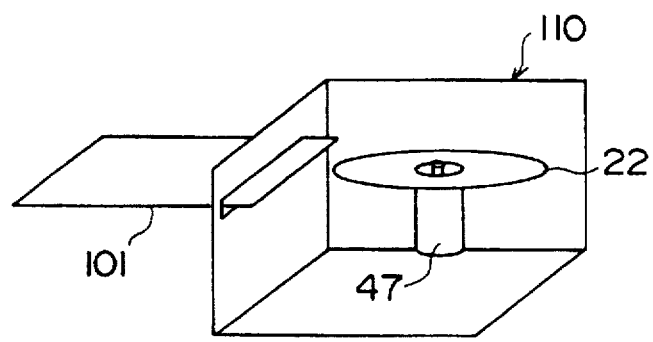

Next, the cartridge body 101 is withdrawn from the optical disk drive 110 in the $X_2$-direction as indicated in FIG. 17(C), and the optical disk 22 remains in the disk drive 110 in the state that the optical disk 22 is mounted upon the spindle 47. By completely removing the cartridge body 101 from the disk drive 110 as indicated in FIG. 17(D), the optical disk 22 is held in the state rotatable freely in the optical disk drive 110, and the reading and/or writing of information is achieved from and to the optical disk 22 thus held in the optical disk drive 110.

FIGS. 18(A)–18(D) show the foregoing process of FIGS. 17(A)–17(D) in more detail.

Figure 18A:
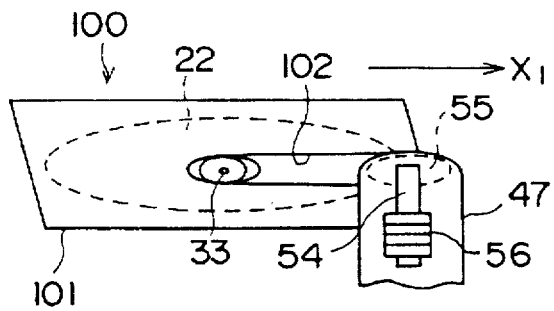
FIGS. 18(A)–18(D) are diagrams showing the loading operation of the optical disk upon the optical disk drive of FIG. 16 in detail.
Figure 18B:
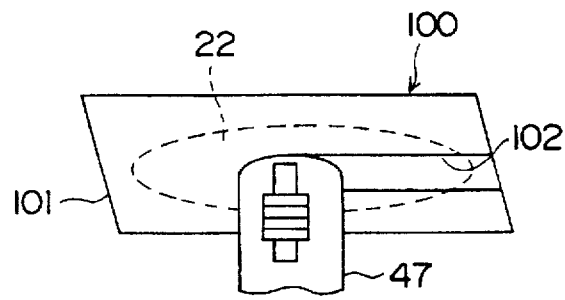
Figure 18C:
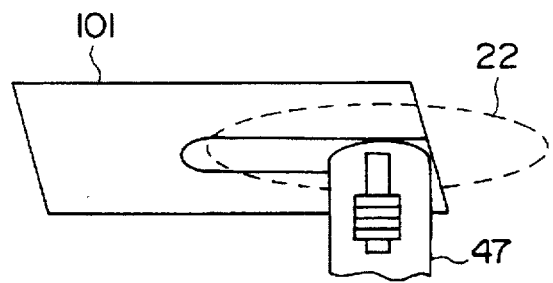
Figure 18D:
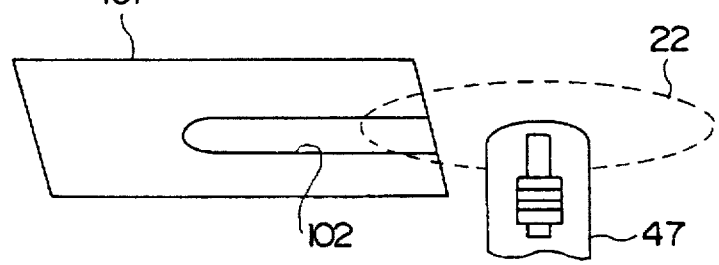

Referring to FIG. 18(A) at first, the spindle 47 engages with the cutout 102 at the edge of the cartridge body 101, and the cartridge body 100 is inserted in the $X_1$-direction while being guided by the spindle 47 in addition to the guide rollers 53 and other guide members. When the cartridge 100 is fully inserted, the spindle 47 engages with the hub 33 as indicated in FIG. 18(B). Further, the cartridge body 101 is withdrawn as indicated in FIG. 18(C), and the disk 22 remains in engagement with the hub 47. When the cartridge body 101 is fully withdrawn, the optical disk 22 is in the state rotatable freely about the spindle 47.

FIGS. 19(A)–19(D) show the process for unloading the optical disk 22 from the optical disk drive 110.

Figure 19A:
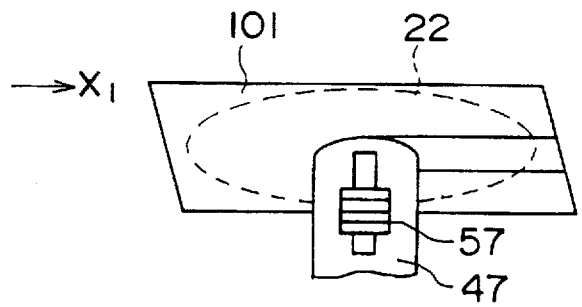
FIGS. 19(A)–19(D) are diagrams showing the unloading operation of the optical disk from the optical disk drive of FIG. 16 in detail.

Referring to FIG. 19(A), the blank cartridge body 101 is inserted into the optical disk drive 110 that is loaded with the optical disk 22. Thereby, the cartridge body 101 is guided by the guide rollers 53 and other guide members as well as the spindle 47 that establishes an engagement with the hub 33 of the optical disk 22.

Figure 19B:
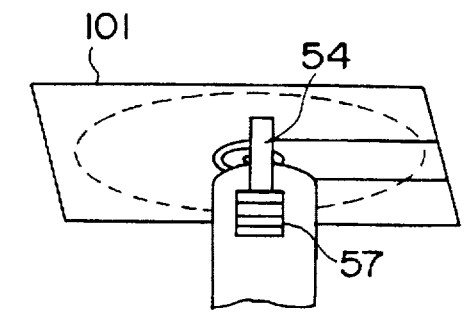
Figure 19C:
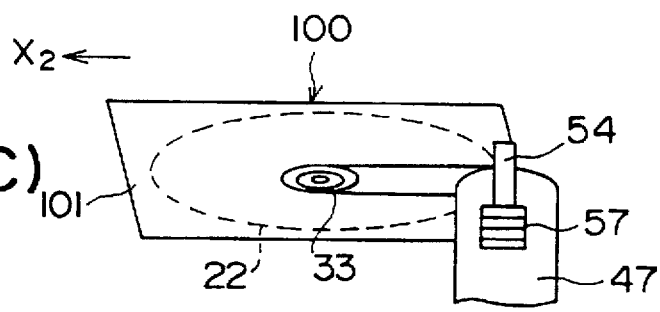
Figure 19D:
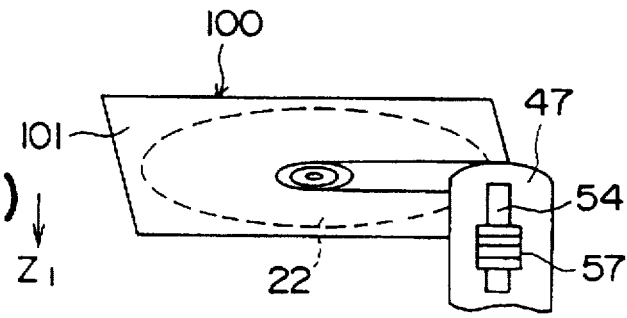

When the cartridge body 101 is fully inserted and the optical disk 22 accommodated in the cartridge body 101, a solenoid 57 provided in the vicinity of the spindle 47 is activated in the step of FIG. 19(B) and the rod 54 provided adjacent to the spindle 47 is pushed up in response to the energization of the solenoid 57. Thereby, the magnetic engagement between the magnet 55 and the hub 33 is broken and the optical disk 22 becomes movable with respect to the spindle 47. Typically, the stroke of the rod 54 is set to be in the order of the thickness of the optical disk 22. Further, the cartridge body 101 is withdrawn in the $X_2$-direction in the step of FIG. 19(C), and the optical disk 22 is withdrawn together with the cartridge body 101. After the cartridge body 101 is pulled out from the disk drive 110, the solenoid 57 is deenergized as indicated in FIG. 19(D).

Figure 20A:
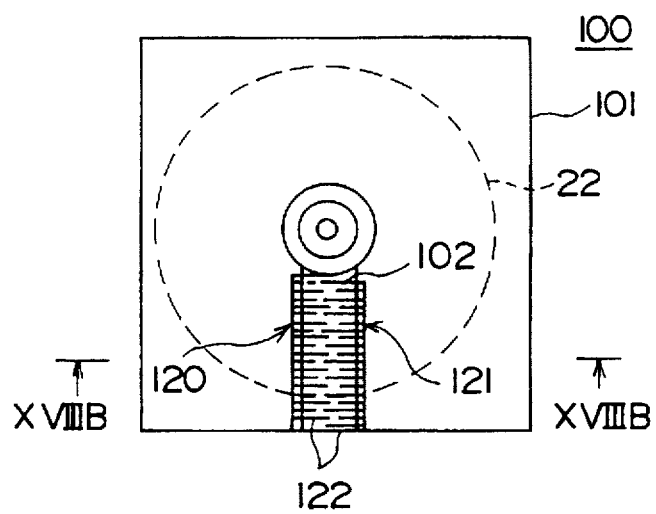
FIGS. 20(A) and 20(B) are diagrams showing a modification of the optical disk cartridge according to the second embodiment.
Figure 20B:
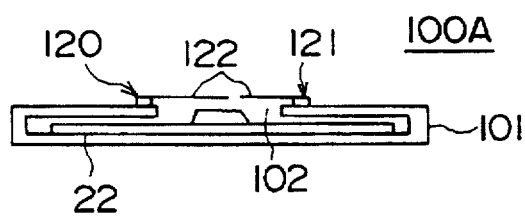

FIG. 20(A) shows a first modification of the cartridge 100 of the present embodiment, wherein the cartridge 100 of the present embodiment uses two brush parts 120 and 121. As can be seen in the plan view of FIG. 20(A) and the cross sectional view of FIG. 20(B), the brush parts 120 and 121 include soft brush wires 122 that are provided to oppose with each other.

Figure 21:
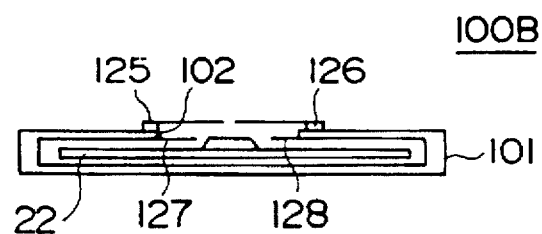
FIG. 21 is a diagram showing a second modification of the optical disk cartridge of the second embodiment.

FIG. 21 shows another modification of the cartridge 100 wherein brush wires 125 and 126 are provided to oppose with each other at a first level and brush wires 127 and 128 are provided to oppose with each other at a second, lower level. As a result of providing the brush wires in two layers, the cartridge of FIG. 21 provides a superior dust protection to the cartridge 100 of FIG. 15.

Figure 22A:
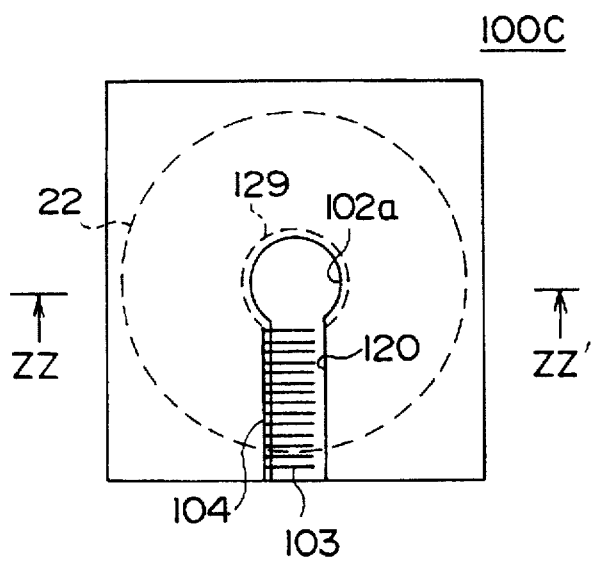
FIGS. 22(A) and 22(B) are diagrams showing a third modification of the optical disk cartridge according to the second embodiment.
Figure 22B:
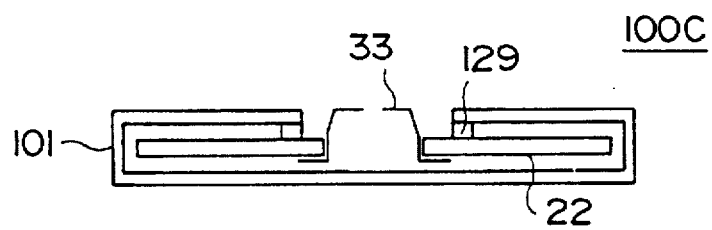

Further, FIGS. 22(A) and 22(B) show still other modification of the cartridge 100 wherein FIG. 22(B) shows a cross sectional view of the cartridge of FIG. 22(A) taken along a line 22–22'. In the present modification, it will be noted that the cartridge body 101 is provided with an arc-shaped rib 129 to surround the hub 33 when the optical disk 22 is accommodated inside the cartridge body 101. Thereby, the penetration of dust into the cartridge is reduced as compared with the embodiment of FIG. 15.

Next, a third embodiment of the present invention will be described with reference to FIG. 23 that shows an optical disk cartridge 130 in a perspective view viewed from a lower direction.

Figure 23:
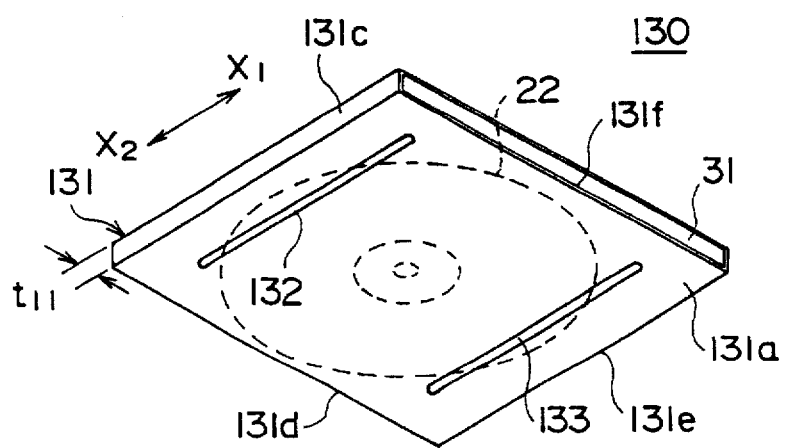
FIG. 23 is a diagram showing an optical disk cartridge according to a third embodiment of the present invention in a perspective view viewed from lower direction.

Referring to FIG. 23, the cartridge 130 includes a cartridge body 131 in which the optical disk 22 is accommodated. Similarly to the cartridge 20 of the first embodiment, the cartridge body 131 includes a bottom surface 131a and an top surface 131b (cannot be seen in FIG. 23), and side walls 131c–131e surround the body 131 laterally except for a side edge 131f wherein an opening for allowing passage of the optical disk 22 is formed. Further, the foregoing opening 131f is closed by a cover lid 31 that is formed as an integral body with the cartridge body 131. Similarly to the cartridge 20 of the first embodiment, the cover lid 31 is urged by a spring corresponding to the spring 34 of FIG. 3 so as to close the opening unless urged externally.

In the cartridge 130 of FIG. 23, there are provided two parallel grooves 132 and 133 on the bottom surface 131a of the cartridge body 131 such that the grooves 132 and 133 extend in the $X_1$-$X_2$ directions. It should be noted that the grooves 132 and 133 penetrate through the bottom surface 131a of the cartridge body 131 for accepting a catching member to be described later.

Figure 24:
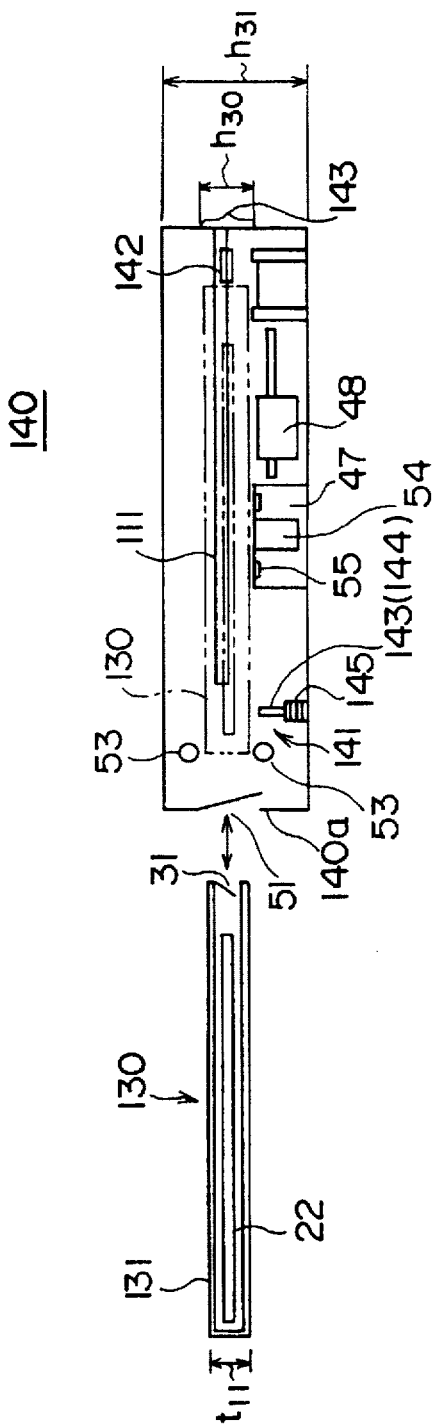
FIG. 24 is a diagram showing the cartridge of FIG. 23 together with an optical disk drive that cooperates with the cartridge of FIG. 23 in a cross sectional view.

FIG. 24 shows the structure of an optical disk drive 140 that cooperates with the optical disk cartridge 130 of the present embodiment. In FIG. 24, those parts described previously with reference to preceding drawings are designated by the same reference numerals and the description thereof will be omitted.

Referring to FIG. 24, the optical disk drive 140 has an insertion opening 140a for accepting the optical disk cartridge 130 similarly to the previous embodiments as indicated by a two-dotted line. Similarly to the optical disk drive 130 of the previous embodiment, the drive 140 includes a guide rail 111 that urges the lid 31 of the cartridge 130 to open when the cartridge 130 is inserted into the opening 140a. Further, the optical disk drive 140 lacks the elevating mechanism 46, and the optical disk 22 is held and revolved without substantially moving up and down in the optical disk drive 140.

In the optical disk drive 140 of FIG. 24, it will be noted that a solenoid-actuated member 141 is provided on the bottom surface of the optical disk drive 140. Further, an optical disk stopper 142 is provided at a rear end of the drive 140. Hereinafter, the construction and function of the solenoid-actuated member 141 and the stopper 142 will be descried in detail with reference to FIGS. 25(A)–25(E) showing the cartridge 131 in the optical disk drive 140 as viewed from the lower direction.

Figure 25A:
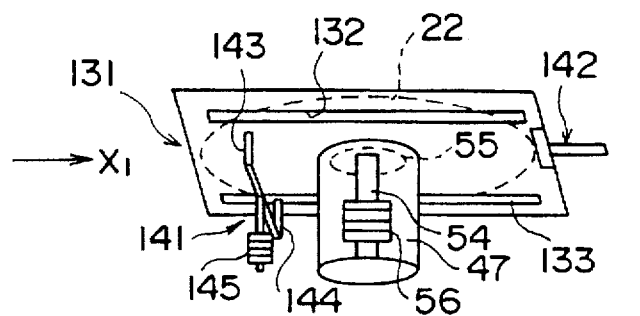
FIGS. 25(A)–25(E) are diagrams showing the loading of the optical disk in the optical disk drive of FIG. 24.

Referring to FIG. 25(A), the member 141 includes a solenoid 145, and pins 143 and 144 are provided so as to be actuated up and down in response to the energization of the solenoid 145. There, the pins 143 and 144 are provided in the vicinity of the opening 140a of the optical disk drive 140 so as to be able to engage with the grooves 132 and 133 when lifted upward, provided that the cartridge 131 is fully inserted into the disk drive 140 until the optical disk 22 in the cartridge 131 is engaged with the stopper 142. It should be noted that the stopper 142 has a T-shaped form and is located at the rear end of the optical disk drive 140 such that the stopper 142 is accepted into the opening 131f of the cartridge 130 by urging the lid 31 when the cartridge 130 is inserted into the optical disk drive 140 in the $X_1$-direction. In this state, the spindle 47 engages with the hub 33 of the disk 22 by the magnet 55 similarly to the previous embodiments.

Figure 25B:
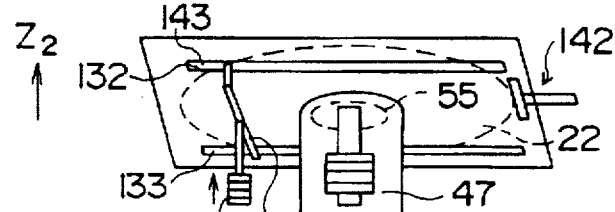
Figure 26:
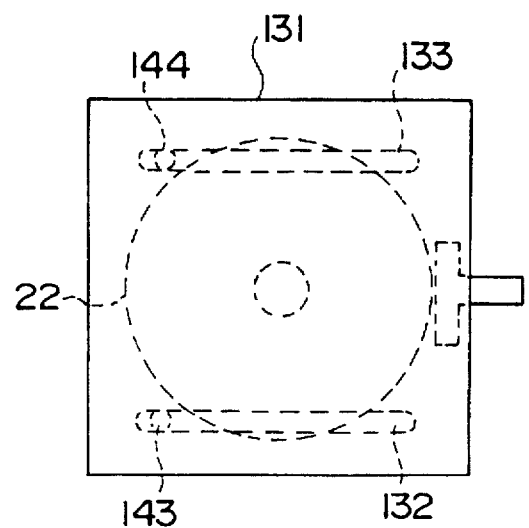
FIG. 26 is a plan view showing the optical disk in the optical disk drive of FIG. 24 in the loaded state.

Next, in the step of FIG. 25(B), the solenoid 145 is energized and the pins 143 and 144 are urged upward as indicated by an arrow, and the pins 143 and 144 are accepted by the grooves 132 and 133. Thereby, the pins 143 and 144 hold the optical disk 22 and the disk 22 is held on the one hand by the pins 143 and 144 and on the other hand by the stopper 142. See also FIG. 26 that shows the optical disk cartridge 130 in the state of FIG. 25(B), wherein FIG. 26 shows the cartridge 130 in the plan view.

Figure 25C:
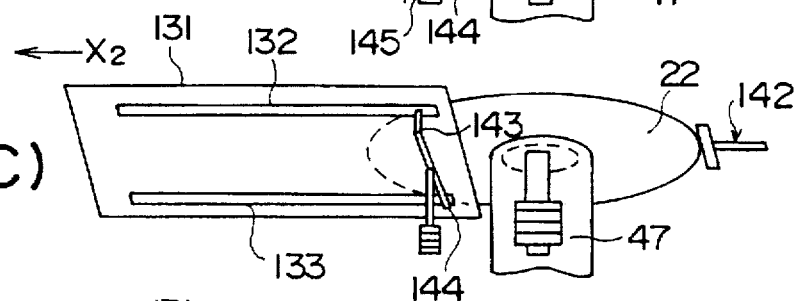

Further, the cartridge body 131 is withdrawn in the $X_2$-direction as indicated in FIG. 25(C). In this step, the pins 143 and 144 move, with respect to the cartridge body 131, along the grooves 132 and 133 until the cartridge body 131 is stopped by the engagement of the pins 143 and 144 with the grooves 132 and 133. In this step, it should be noted that the optical disk 22 remains on the spindle 47 as it is, except for a minute displacement in the $X_2$ direction, as a result of engagement with the pins 143 and 144 in spite of withdrawal of the cartridge body 131 in the $X_2$direction. As a result of the foregoing minute displacement in the $X_2$-direction, the mechanical engagement between the optical disk 22 and the stopper 143 is canceled.

Figure 25D:
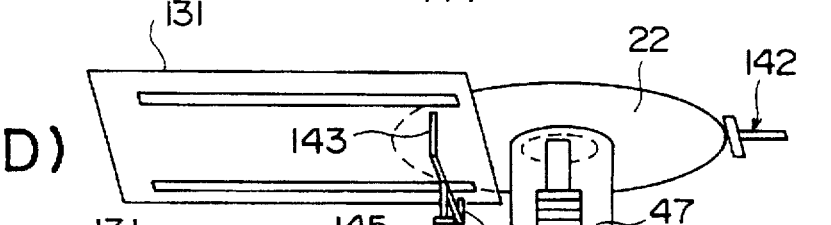
Figure 25E:
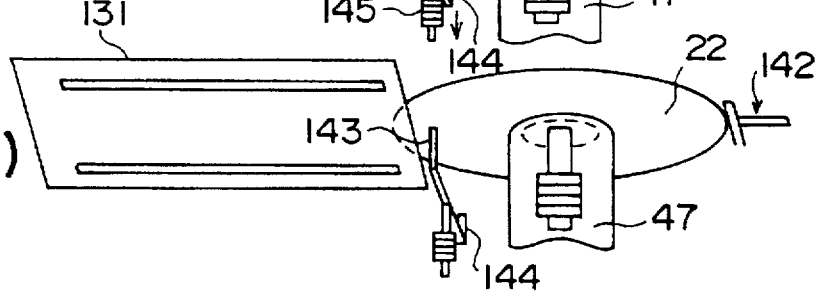

Next, in the step of FIG. 25(D), the solenoid 145 is deenergized, and the pins 143 and 144 are lowered as indicated by an arrow. Thereby, further withdrawal of the cartridge body 131 becomes possible, and the cartridge body 131 is pulled in the $X_2$direction as indicated in FIG. 25(E). Thereby, the cartridge body 131 is entirely removed from the optical disk drive 140, leaving the optical disk 22 alone on the spindle 47. As a result of the foregoing minute displacement in the $X_2$-direction in the step of FIG. 25(C), the optical disk 22 becomes rotatable freely with the spindle 47 in the state shown in FIG. 25(E).

Next, the removal of the optical disk 22 from the optical disk drive 140 will be described with reference to FIGS. 27(A)–27(D). For the sake of simplicity, illustration of the solenoid 145 is omitted.

Figure 27A:
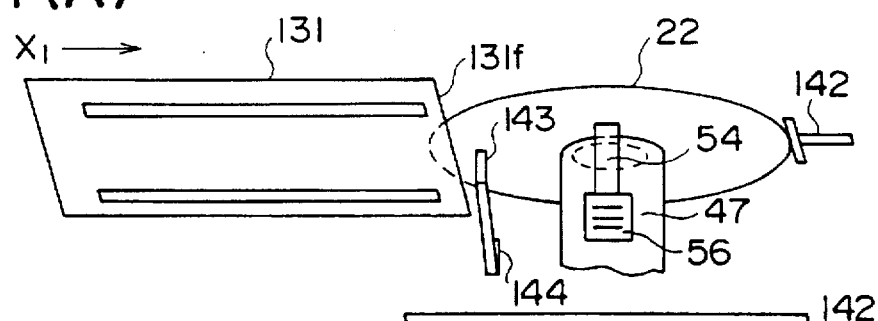
FIGS. 27(A)–27(D) are diagrams showing the unloading of the optical disk from the optical disk drive of FIG. 24.
Figure 27B:
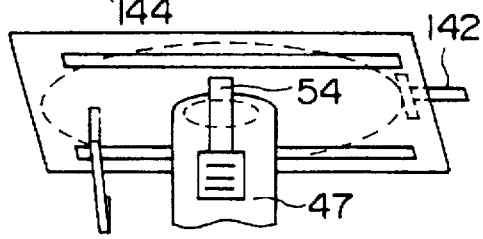

Referring to FIG. 27(A), the solenoid 56 provided in the vicinity of the spindle 47 is energized and the pin 54 is actuated to push the optical disk 22 in the upward direction. Thereby, the magnetic coupling between the magnet 55 on the spindle 47 and the hub 33 of the disk 22 is canceled. In the state of FIG. 27(A), the pins 143 and 144 are in the lowered state, and the blank cartridge body 131 of the cartridge 130 is inserted into the optical disk drive 140 in the $X_1$-direction. By forming a slope at the edge 131f, one can insert the cartridge body 131 even when the pin 54 is in contact with the optical disk 22 in the vicinity of the hub 33. Thereby, the movement of the optical disk 22 in the $X_1$-direction is restricted by the stopper 142. When the cartridge body 131 is fully inserted, the optical disk 22 is accommodated in the body 131 as indicated in FIG. 27B.

Figure 27C:
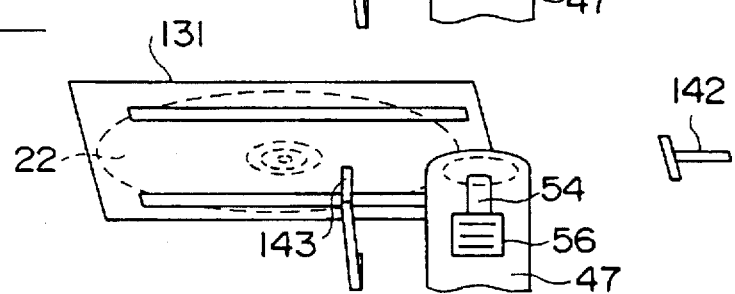
Figure 27D:
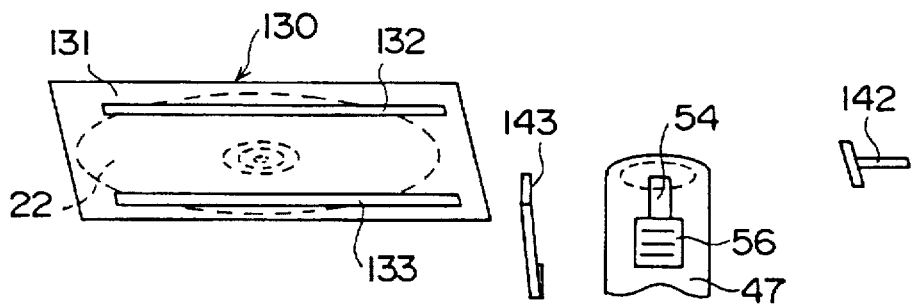

Next, in the step of FIG. 27(C), the pin 54 is lowered, and the cartridge body 131 is withdrawn in the $X_2$-direction. Thereby, the disk 22 is withdrawn from the optical disk drive 140 together with the cartridge body 131. With further withdrawal, the cartridge 130 is entirely removed from the optical disk drive 140 as indicated in FIG. 27(D).

Referring to FIG. 24 showing the optical disk drive 140 again, it will be noted that one can minimize the height $h_{30}$ of the space that is occupied by the cartridge 130 in the optical disk drive 140. Thereby, a height corresponding to the thickness $t_{11}$ of the cartridge 130 is sufficient for the height $h_{30}$, and one can minimize the height of the optical disk drive 140.

Next, a fourth embodiment of the present invention will be described with reference to FIG. 28 that shows an optical disk cartridge 150 in a perspective view from upward direction.

Figure 28:
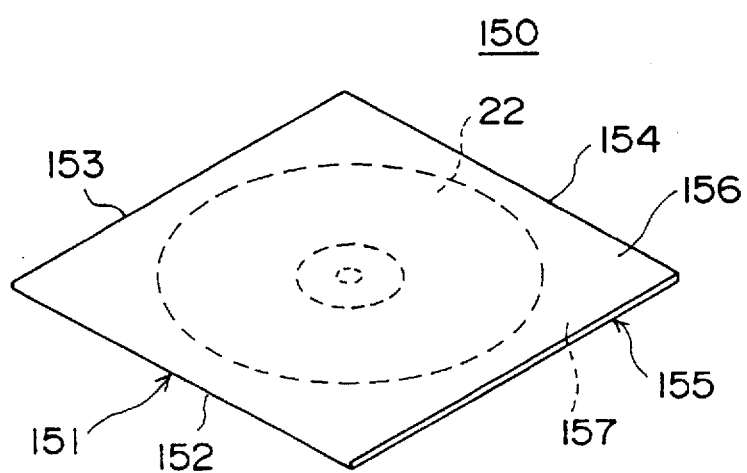
FIG. 28 is a diagram showing an optical disk cartridge according to a fourth embodiment of the present invention.

Referring to FIG. 28, the optical disk cartridge 150 is formed of a generally square soft jacket 151 having an upper sheet 156 and a lower sheet 157. The jacket 151 is surrounded by four edges 152–155, wherein the edges 152–154 are closed while the edge 155 forms an opening such that the optical disk can be taken out from the jacket 151 through the opening 155. The jacket 151 is formed of a resilient material and the opening 155 is closed unless the jacket 151 is intentionally deformed. It should be noted that the cartridge 150 of the present embodiment has a thickness $t_{12}$ that is much smaller than the thickness $t_{11}$ of any of the cartridges described previously.

Figure 29:
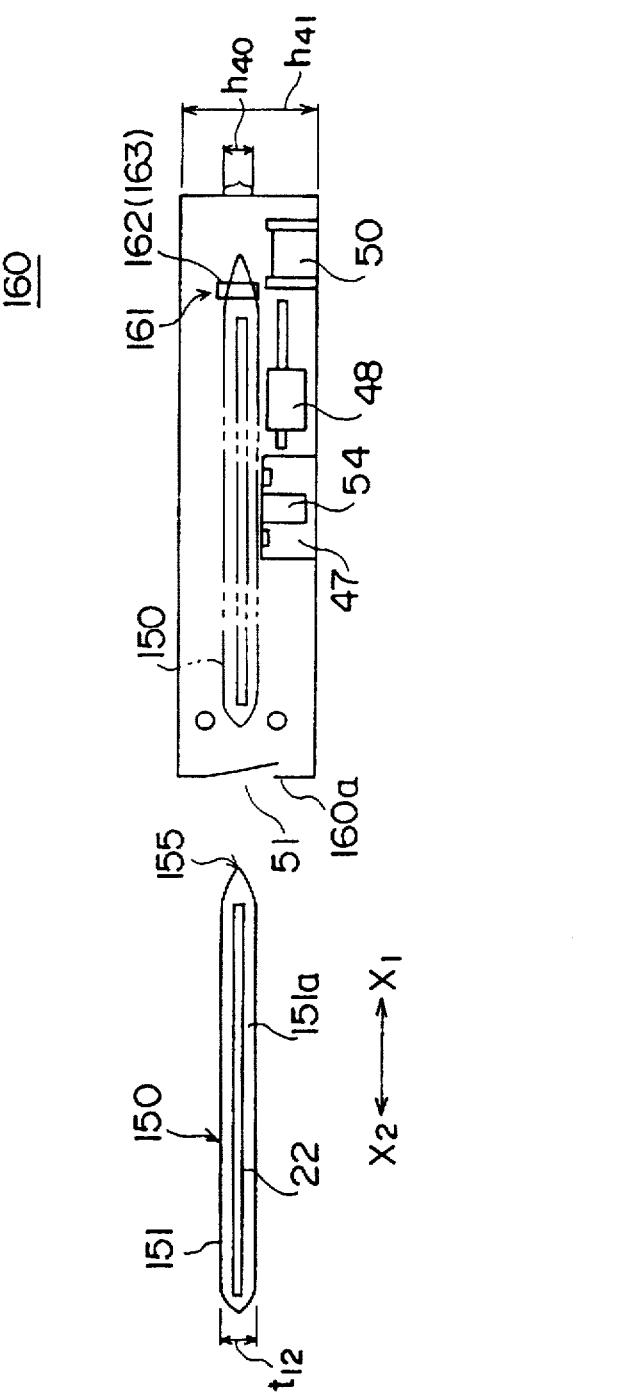
FIG. 29 is a diagram showing the cartridge of FIG. 28 together with an optical disk drive that cooperates with the cartridge of FIG. 28 in a cross sectional view.

FIG. 29 shows the construction of the optical disk drive 160 that cooperates with the optical disk cartridge 150.

Referring to FIG. 29, the optical disk drive 160 has a construction similar to the optical disk drive 140 in that the disk drive 160 lacks the elevating mechanism 46 for ascending or descending the optical disk 22 inside the disk drive 160. Further, the disk drive 160 lacks the catching mechanism such as the mechanism 45 or 141. On the other hand, the disk drive 160 is provided with a mechanism 161 for opening the jacket 151 of the cartridge 150, wherein the mechanism 161 includes pins 162 and 163 of which function is described below with reference to FIGS. 30(A)–30(E).

Figure 30A:
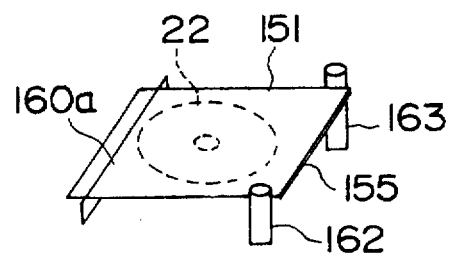
FIGS. 30(A)–30(E) are diagrams showing the loading of the optical disk in the optical disk drive of FIG. 29.

Referring to FIG. 30(A) showing the cartridge 150 inserted into the optical disk drive 160 through an opening 160a provided on the disk drive 160, it will be noted that the pins 162 and 163 are located adjacent to the opening 155 of the jacket 151. In the state of FIG. 30(A), the optical disk 22 is attached to the spindle 47 as a result of the magnetic engagement between the hub 33 of the disk 22 and the magnet 55 on the spindle.

Figure 30B:
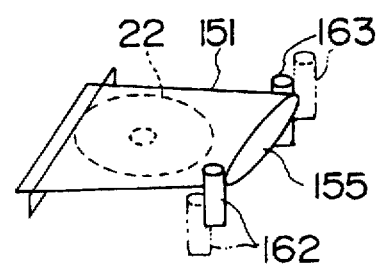
Figure 30C:
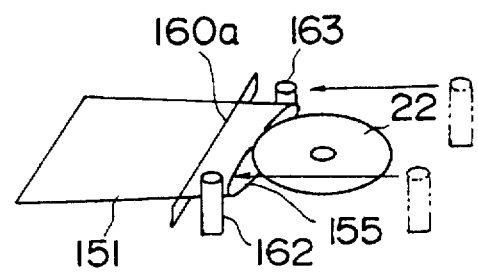
Figure 30D:
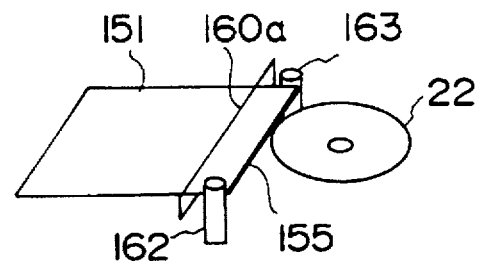

Next, in the step of FIG. 30(B), the pins 162 and 163 are moved to approach with each other, and the opening 155 of the jacket 151 is opened as indicated in FIG. 30(B). Further, in the step of FIG. 30(C), the pins 162 and 163 are moved in the $X_2$-direction and the jacket 151 is moved also in the $X_2$ direction together with the pins 162 and 163. Thereby, the optical disk 22, attached to the spindle 47 by the magnetic coupling, is left in the optical disk drive 160 as indicated in FIG. 30(C). When the pins 162 and 163 are moved fully in the $X_2$-direction, the pins 162 and 163 are moved laterally to separate from each other, and the opening 155 is closed as indicated in FIG. 30(D).

Figure 30E:
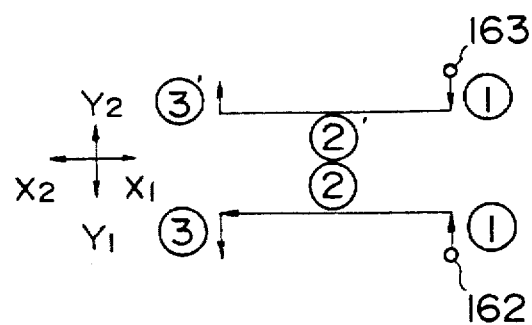

FIG. 30(E) shows the path of movement of the pins 162 and 163. In the step of FIG. 30(B), the pins 162 and 163 move laterally as indicated respectively by paths (1) and (1'), and the pins 162 and 163 move in the $X_2$-direction as indicated by paths (2) and (2') in the step of FIG. 30(C). Further, in the step of FIG. 30(D), the pins 162 and 163 are moved in the lateral direction as indicated by paths (3) and (3') respectively.

FIGS. 31(A)–31(F) show the process for removing the optical disk 22 from the optical disk drive 160.

Figure 31A:
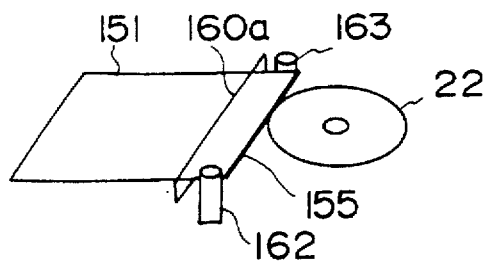
FIGS. 31(A)–31(F) are diagrams showing the unloading of the optical disk in the optical disk drive of FIG. 29.
Figure 31B:
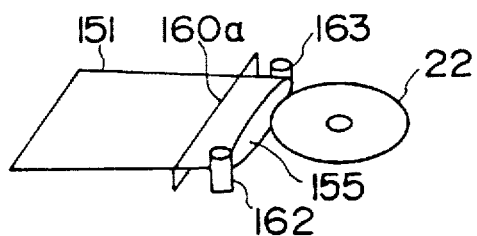

Referring to FIG. 31(A), the pins 162 and 163 are moved to locate in the vicinity of the opening 160a wherein the pins 162 and 163 are urged to separate from each other such that the jacket 151 can enter into the optical disk drive 160 freely through the opening 160a. Further, the magnetic engagement between the disk 22 and the hub 47 is released by actuating the solenoid-driven rod 54 similarly to the previous embodiments. Upon insertion of the jacket 151 into the opening 160a, the pins 162 and 163 are moved to approach with each other as indicated in FIG. 31(B), and the opening 155 of the jacket 151 is opened such that the insertion of the disk 22 into the jacket 151 becomes possible. With further movement of the optical disk 22 in the step of FIG. 31(C), the pins 162 and 163 move in the $X_1$-direction, and the jacket is moved also in the $X_1$-direction. Thereby, the jacket 151 moves to a position between the hub 33 of the optical disk 22 and the solenoid-driven rod 54 that is urged to push the optical disk 22 in the upward direction. Finally, the optical disk 22 is accommodated into the jacket 151 thus moved in the $X_1$-direction as indicated in FIG. 31(C).

Figure 31C:
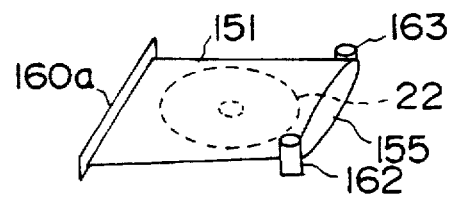
Figure 31D:
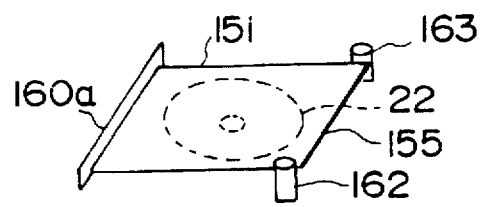
Figure 31E:
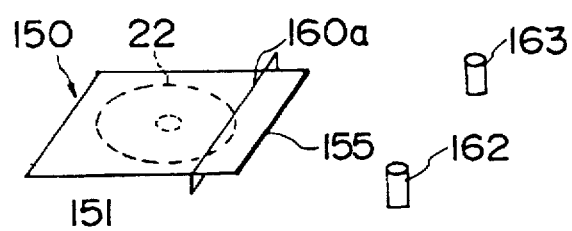

Next, in the step of FIG. 31(D), the pins 162 and 163 are moved to separate from each other, and the opening 155 of the jacket 151 is closed. In the state of FIG. 31(D), the engagement of the pins 162 and 163 upon the jacket 151 is released, and the jacket 151 is in the state freely removable from the optical disk drive 160. Thus, one can remove the jacket 151 together with the optical disk 22 accommodated therein out from the optical disk drive 160.

Figure 31F:
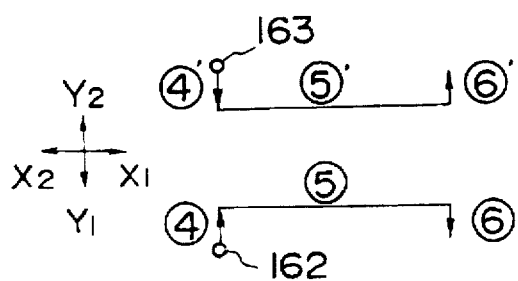

FIG. 31(F) shows the path of movement of the pins 162 and 163 in the process of FIGS. 31(A)–31(D).

Referring to FIG. 31(F), the pins 162 and 163 move laterally along the paths (4) and (4') in the step of FIG. 31(B), while the pins 162 and 163 move along the paths (5) and (5') in the step of FIG. 31(C). Further, in the step of FIG. 31(D), the pins 162 and 163 are moved along the paths (6) and (6').

Next, the mechanism for causing the movement of the pins 162 and 163 as indicated in FIG. 30(E) or 30(F) will be described with reference to FIGS. 32(A)–32(D).

Figure 32A:
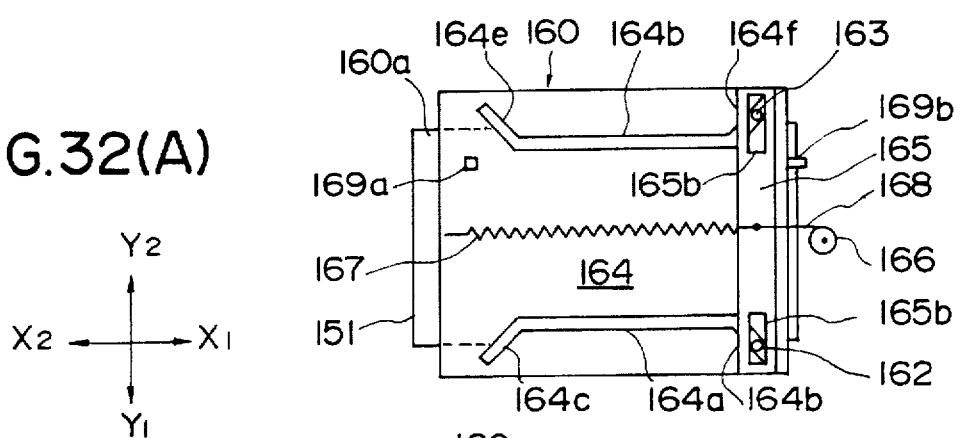
FIGS. 32(A)–32(D) are diagrams showing the mechanism of the optical disk drive of FIG. 29 for loading the optical disk.
Figure 32B:
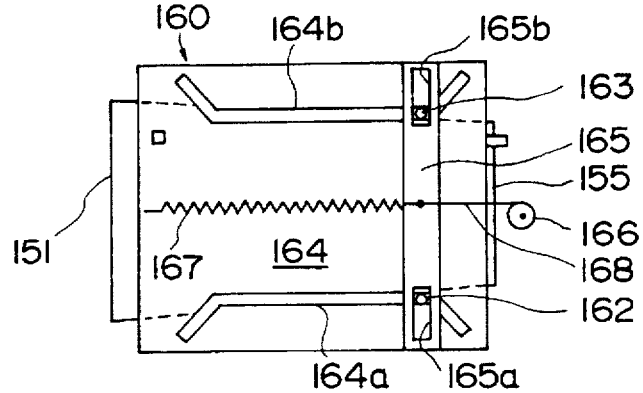
Figure 32C:
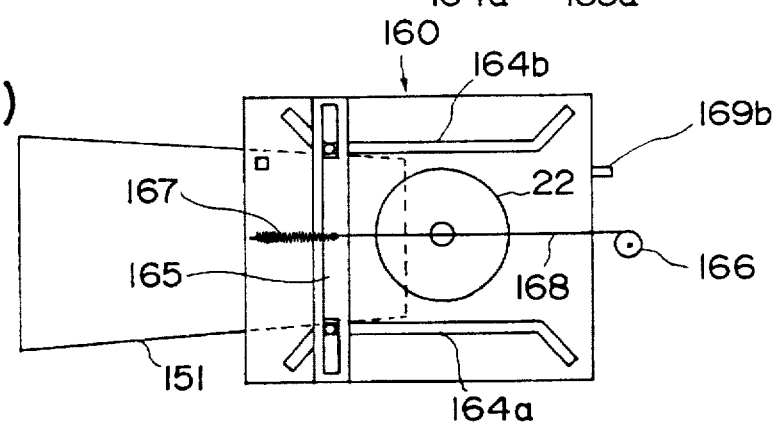

FIG. 32(A) shows the state wherein the cartridge body 151 is fully loaded into the optical disk drive 160 together with the optical disk 22. It will be seen that the optical disk drive 160 includes a bottom plate 164 that is defined with a pair of guide grooves 164a and 164b generally extending in the $X_1$–$X_2$ direction except that both longitudinal ends 164c and 164f or 164e and 164f are bent laterally in the $Y_1$–$Y_2$ direction such that the separation between the guide grooves 164a and 164b increases in correspondence to such longitudinal ends of the grooves 164a and 164b. Further, the foregoing pins 162 and 163 are guided along the grooves 164a and 164b, wherein the pins 162 and 163 are connected with each other by a guide plate 165. The guide plate 165 is formed with elongate guide openings 165a and 165b each extending in the $Y_1$–$Y_2$ direction, and the pins 162 and 163 engage with the guide openings 165a and 165b respectively in a manner movable in the $Y_1$–$Y_2$ direction. The guide plate 165 is connected to a spring 167 that urges the guide plate 165 in the $X_2$-direction. Further, the guide plate 165 is connected to a wire 168 that in turn is connected to a take-up mechanism 166, wherein the take-up mechanism 166 urges the guide plate 165 in the $X_1$ direction via the wire 160. In the state of FIG. 32(A), the plate 165 is urged in the $X_1$-direction such that the pins 162 and 163 are held in the edge part 164d and 164f of the grooves 164a and 164b. Thereby, the separation between the pins 162 and 163 is increased, and the optical disk cartridge 150 can be inserted into the $X_1$-direction freely as indicated in FIG. 32(A), until stopped by a stopper mechanism not illustrated. The state of FIG. 32(A) corresponds to the state of FIG. 30(A).

When the cartridge 150 is thus inserted, a sensor 169 provided at the rear part, away from the insertion opening 160a of the bottom plate 164, detects the cartridge body 151 and the urging action of the mechanism 166 to urge the plate 165 in the $X_1$-direction is canceled. Thereby, the plate 165 is moved in the $X_2$-direction by the force exerted by the spring 167, and the pins 162 and 163 are disengaged from the edge parts 164d and 164f of the grooves 164a and 164b. Thereby, the pins 162 and 163 approach with each other to hold the flexible jacket 151 of the cartridge 150 laterally. As a result, the jacket 151 is deformed as explained already with reference to FIG. 30(B).

As a result of the urging action of the spring 167, the guide plate 165 moves in the $X_2$-direction, and the jacket 151 is moved also in the $X_2$-direction together with the guide plate 165. Thereby, the optical disk 22 is left inside the optical disk drive 160 in magnetic engagement with the spindle 47 as already explained with reference to FIG. 30(C).

Figure 32D:
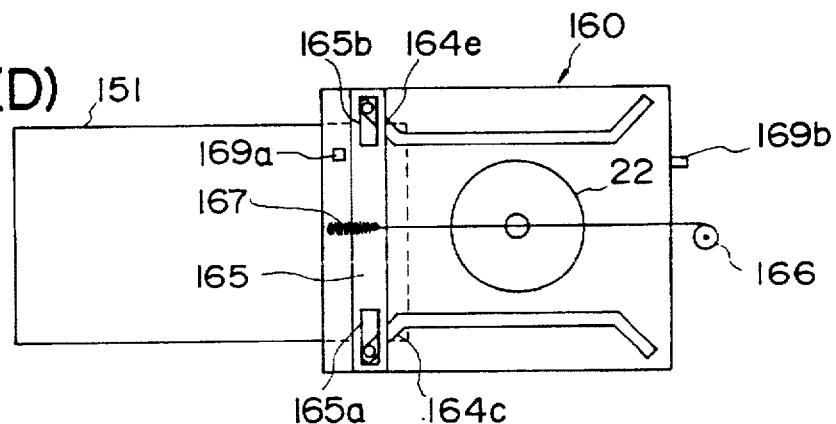

When the guide plate 165 has moved fully in the $X_2$-direction, the pins 162 and 163 are engaged with the edge parts 164c and 164e of the grooves 164a and 164b as indicated in FIG. 32(D). Thereby, the pins 162 and 163 move laterally in the direction to separate from each other, and the engagement of the pins 162 and 163 upon the jacket 151 is canceled. Thus, the state of FIG. 32(D) corresponds to the state of FIG. 30(D).

FIGS. 33(A)–33(D) show the unloading process of the optical disk 22.

Figure 33A:
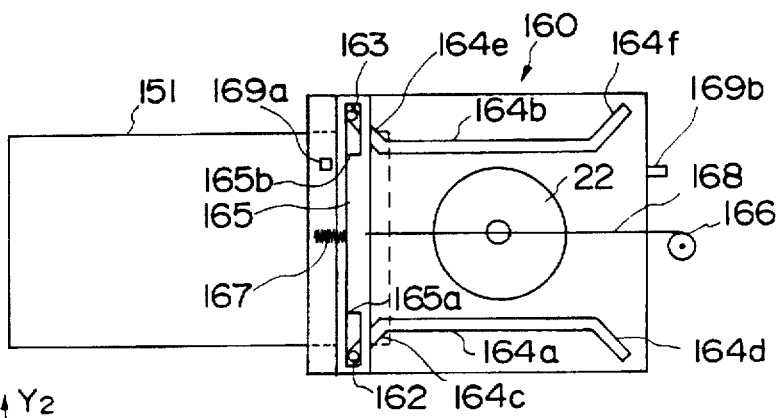
FIGS. 33(A)–33(D) are diagrams showing the mechanism of the optical disk drive of FIG. 29 for unloading the optical disk.

In the state of FIG. 33(A), the guide plate 165 is moved fully in the $X_2$-direction by the action of the spring 167, and the pins 162 and 163 are engaged with the edge parts 164c and 164e of the guide grooves 164a and 164b.

Figure 33B:
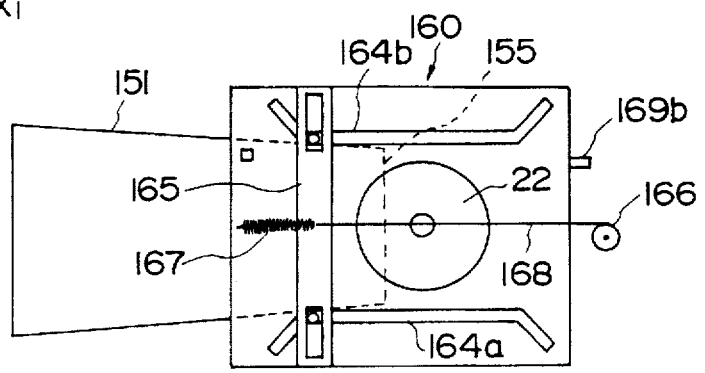
Figure 33C:
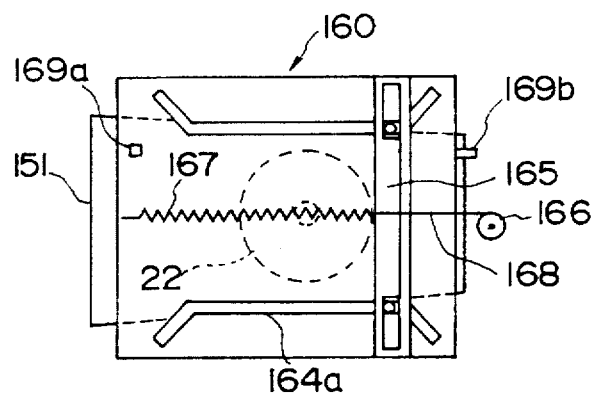

When the jacket 151 of the cartridge 150 is inserted into the optical disk drive 160 in this state, the sensor 169a provided adjacent to the cartridge insertion opening 160a detects the jacket 151 and the take-up mechanism 166 is activated in response thereto. Thereby, the take-up mechanism 166 takes up the wire 168 and the guide plate 165 is moved in the $X_1$ direction in response thereto. Thereby, the pins 162 and 163 are moved along the guide openings 165a and 165b to approach with each other as indicated in FIG. 33(B), and the jacket 151 is deformed such that the opening 155 of the jacket 151 is opened as indicated in FIG. 31(B).

Figure 33D:
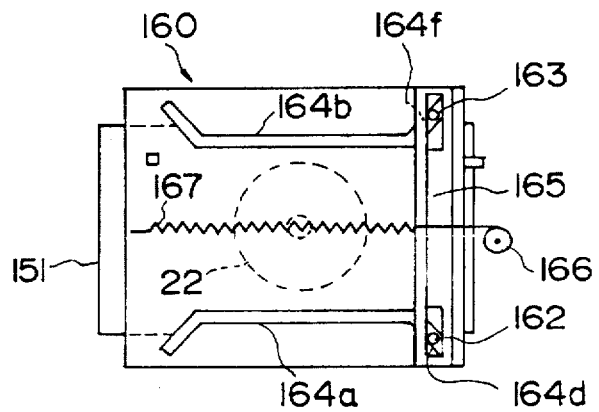

With further energization of the take-up mechanism 166, the guide plate 165 is moved in the $X_1$-direction as indicated in FIG. 31(C) against the force exerted by the spring 167 until the jacket 151 engages with a stopper not shown in FIG. 31(C). Thereby, the optical disk 22 enters into the jacket 151 through the opening 155 that is urged in the opened state. Further, the guide plate 165 is moved further in the $X_1$-direction by the take-up mechanism 166, and the pins 162 and 163 are moved away from each other as a result of engagement with the end parts 164d and 164f as indicated in FIG. 33(D). Thereby, the engagement of the pins 162 and 163 with the jacket 151 is released and one can withdraw the jacket 151 away from the optical disk drive 160 together with the optical disk 22 accommodated in the jacket 151.

Figure 34A:
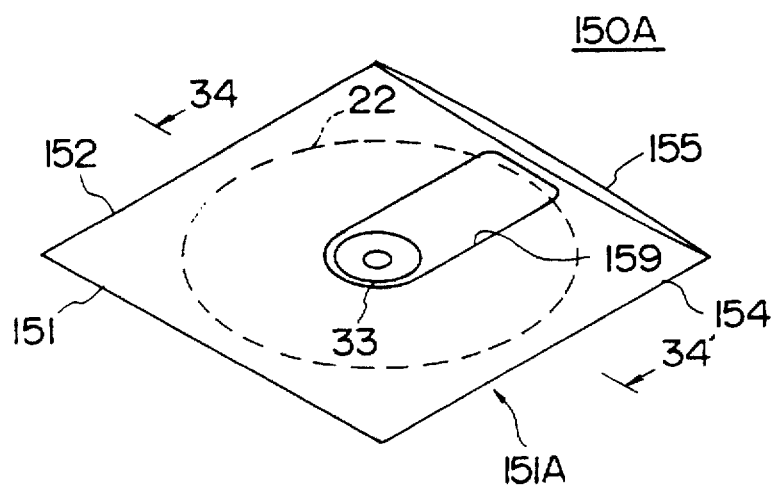
FIGS. 34(A) and 34(B) are diagrams showing the optical disk cartridge according to a modification of the fourth embodiment.
Figure 34B:
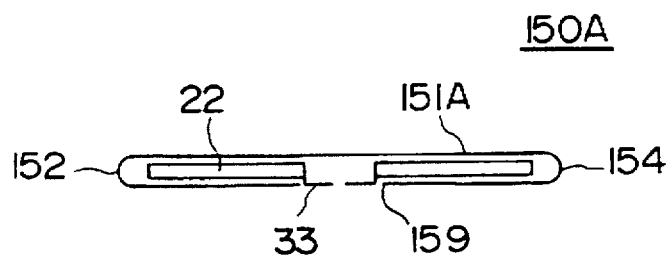

FIGS. 34(A) and 34(B) show a modification of the optical disk cartridge 150 of FIG. 28 respectively in the perspective view and cross sectional view.

Referring to the drawings showing an optical disk cartridge 150A, the jacket 151 of the cartridge 150A is formed with an elongate cutout 159 to expose the recording surface of the optical disk 22 including the hub 33, such that reading of information from the optical disk 22 and/or wiring of information onto the optical disk 22 becomes possible through the cutout 159.

Figure 35A:
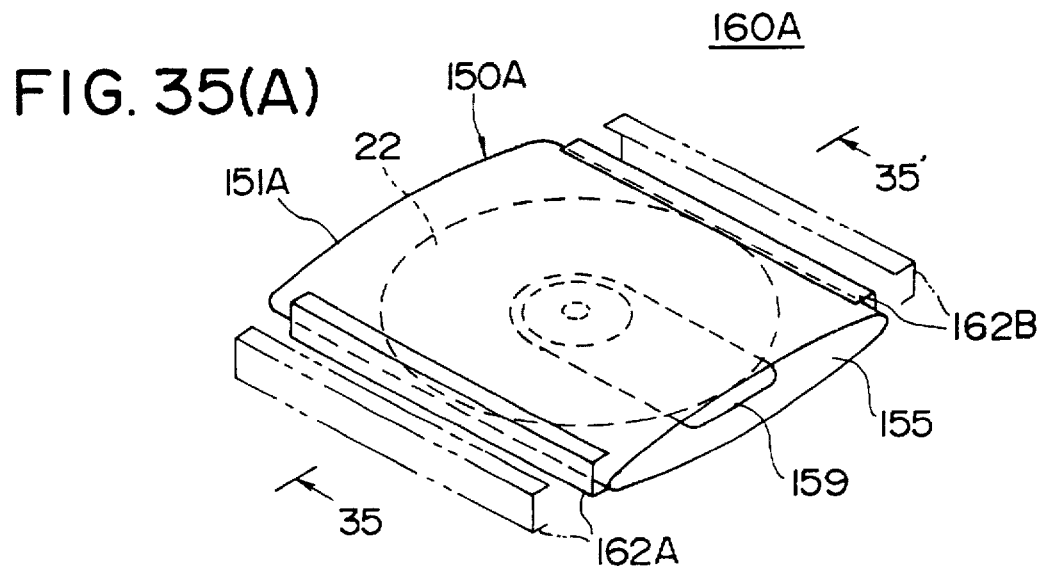
FIGS. 35(A) and 35(B) are diagrams showing the optical disk cartridge of FIGS. 34(A) and 34(B) in the state loaded upon an optical disk drive.
Figure 35B:
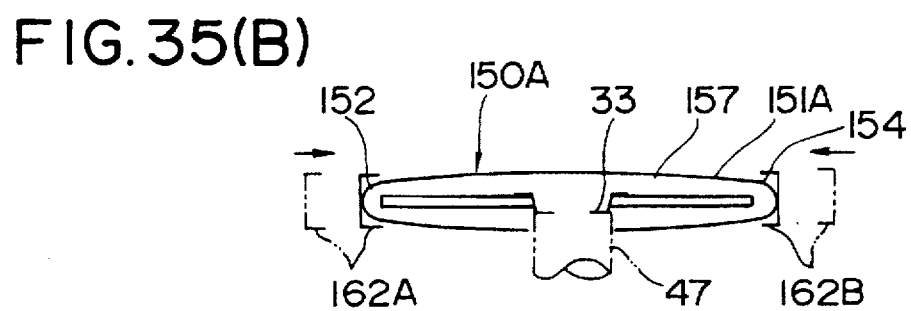

FIGS. 35(A) and 35(B) show the optical disk 22 in the loaded state wherein the optical disk 22 is loaded on an optical disk drive 160A, wherein FIG. 35(A) is a perspective view and FIG. 35(B) is a cross sectional view taken along a line 35–35'.

Referring to FIGS. 35(A) and 35(B), pinch members 162A and 162B are provided within the optical disk drive 160A in place of the pins 162 and 163 as well as associated drive mechanisms. As indicated in FIG. 35(B), the pinch members 162A and 162B are movable in the lateral direction and deforms the jacket 151 of the cartridge 150A by contacting with the cartridge 150A laterally. Upon deformation, there is formed a space 157 inside the cartridge 150 between the optical disk 22 and the jacket 151A and the mechanical engagement between the optical disk 22 and the jacket 151A is released. Thereby, the optical disk 22 becomes rotatable inside the jacket 151A.

In the state of FIG. 35(A), the reading and/or writing of information is achieved by the optical head 48 via the elongate cutout 159.

Figure 36:
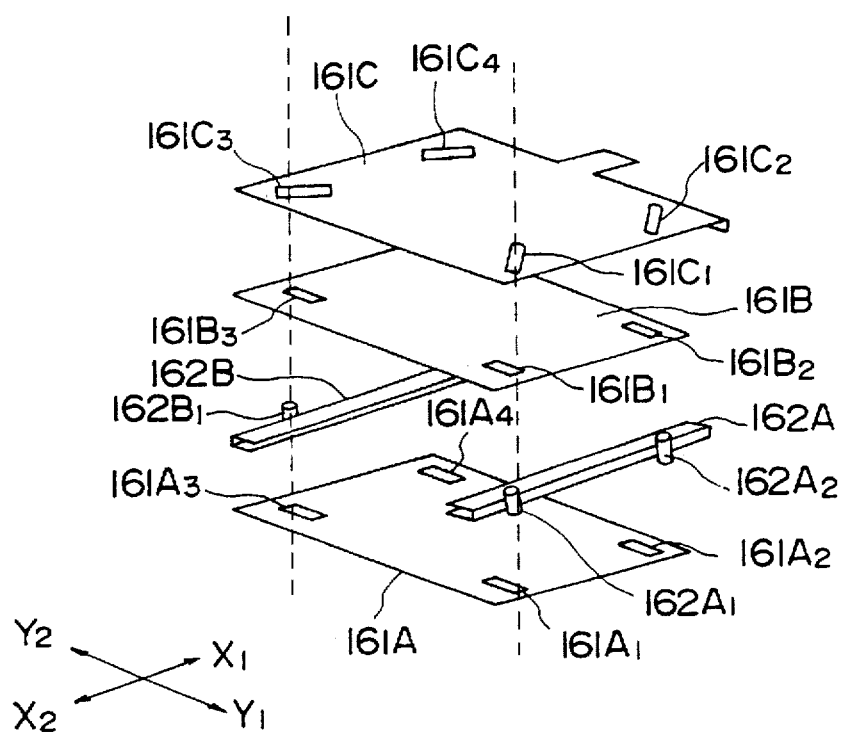
FIG. 36 is a diagram showing a mechanism used for loading the optical disk in FIGS. 35(A) and 35(B)

FIG. 36 shows the actuation mechanism for causing the pinch members 162A and 162B to move laterally.

Referring to FIG. 36, the actuation mechanism includes a first guide plate 161A and a second guide plate 161B disposed thereon, wherein the foregoing pinch members 162A and 162B are provided between the first and second guide plates 161A and 161B. It will be noted that the pinch member 162A is provided with actuation pins $162A_1$ and $162A_2$ for causing the movement of the member 162A. Similarly, the pinch member 162B is provided with actuation pins $162B_1$ and $162B_2$ although the pin $162B_2$ cannot be seen in the illustration of FIG. 36. In correspondence to the pins $162A_1$, $162A_2$, $162B_1$ and $162B_2$, guide grooves $161A_1$ through $161A_4$ are provided on the guide plate 161A to extend laterally in the $Y_1-Y_2$ direction. Similarly, the guide plate 161B is provided with elongate guide grooves $161B_1-161B_4$, although the guide groove $161B_4$ cannot be seen in FIG. 36 for accommodating the pins $162A_1-162B_2$. The guide plates 161A and 161B are fixed upon a chassis of the optical disk drive 160, and the pinch members 162A and 162B are held in the state movable in the lateral direction between the guide plates 161A and 161B.

Above the second guide plate 161B, there is provided a movable actuation plate 161C that is provided with oblique guide grooves $161C_1-161C_4$ for accepting corresponding one of the pins $162A_1$, $162A_2$, $162B_1$ and $162B_2$. Thereby, the plate 161C is provided movably in the $X_1-X_2$ direction, and the movement of the plate 161C causes a lateral movement of the pins $162A_1$, $162A_2$, $162B_1$ and $162B_2$ that in turn causes a lateral movement of the pinch members 162A and 162B as explained before with respect to FIGS. 35(A) and 35(B).

Figure 37A:
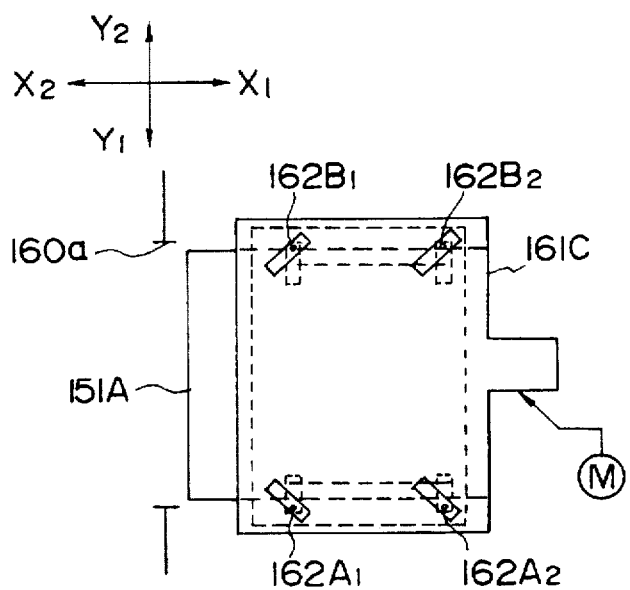
FIGS. 37(A)–37(C) are diagrams showing the actuation of the mechanism of FIG. 36.
Figure 37B:
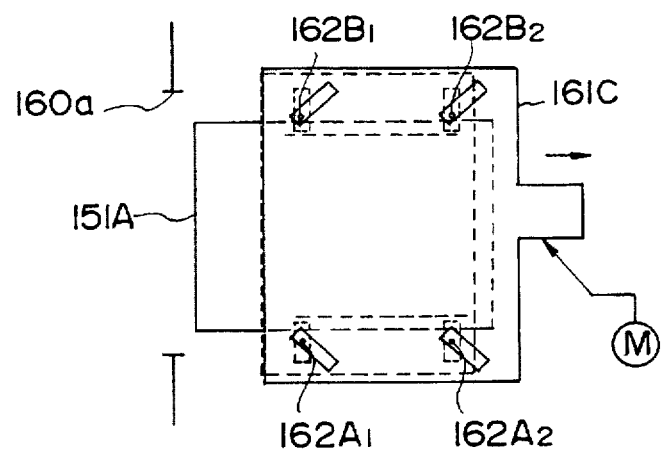
Figure 37C:
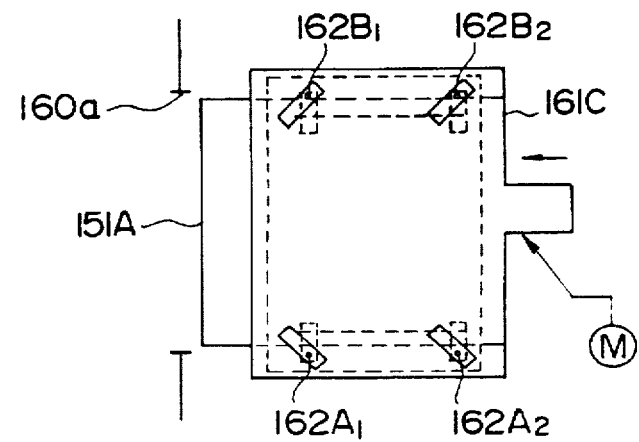

FIGS. 37(A)–37(C) show the operation of the mechanism of FIG. 36.

In the state of FIG. 37(A), the actuation plate 161C is set in a retracted position wherein the pins $162A_1$ and $162B_1$ are separated from each other in the $Y_1-Y_2$ direction by a motor M. Similarly, the pins $162A_2$ and $162B_2$ are also separated. In this state, the pinch members 162A and 162B are separated from the jacket 151A of the cartridge 151A inserted into the optical disk drive 160A.

In the state of FIG. 37(B), on the other hand, the actuation plate 161C is moved in the $X_1$-direction by the motor M, and the pins $162A_1$ and $162B_1$ are moved to approach with each other. Simultaneously, the pins $162A_2$ and $162B_2$ approach with each other, and the pinch members 162A and 162B engage with the jacket 151A laterally. Thereby, the jacket 151A is deformed as already explained with reference to FIG. 35(A).

Further, in the step of FIG. 37(C), the motor M moves the actuation plate 161C in the $X_2$-direction, and the pinch members 162A and 162B separate from the jacket 151A.

Figure 38A:
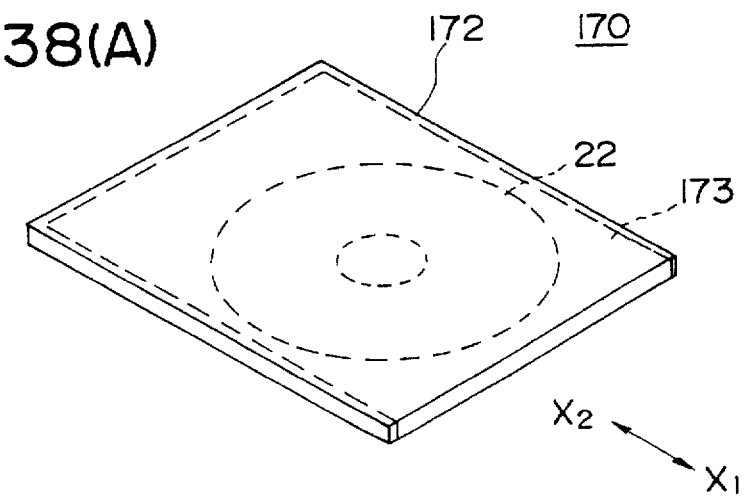
FIGS. 38(A) and 38(B) are diagrams showing an optical disk cartridge according to a fifth embodiment of the present invention.
Figure 38B:
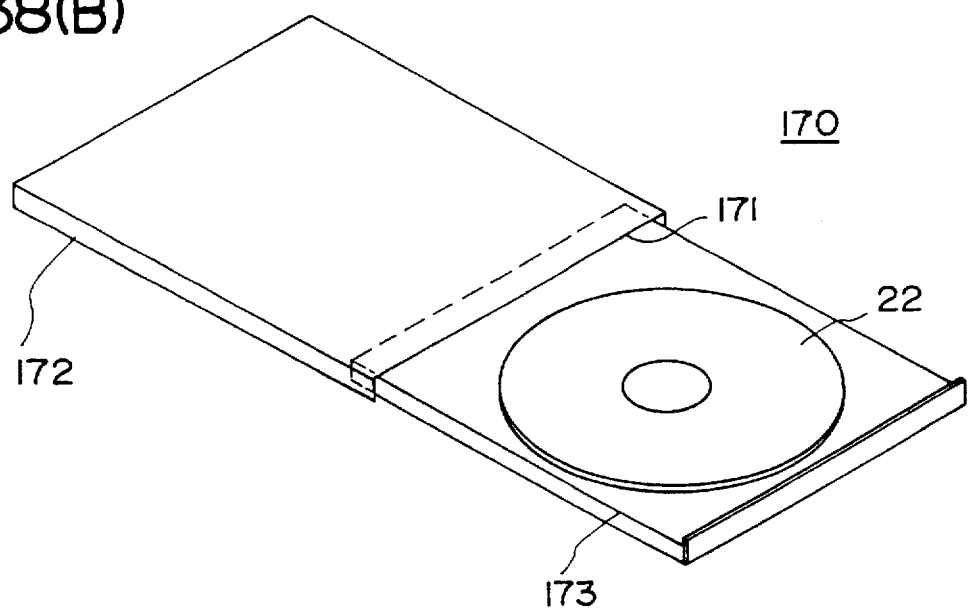

Next, a fifth embodiment of the present invention will be described with reference to FIGS. 38(A) and 38(B), wherein FIG. 38(A) shows an optical disk cartridge 170 in a perspective view in a state wherein the optical disk 22 is accommodated in the cartridge and FIG. 38(B) shows the state wherein the optical disk is taken out from the cartridge 170.

Referring to FIGS. 38(A) and 38(B), the optical disk cartridge 170 includes a cartridge body 172 having an opening 171 at an edge thereof, and a tray 173 is provided removable in a space 178 defined within the cartridge body 172. Further, the tray 173 is formed with a shallow depression 173a in conformity with the optical disk 22, and the optical disk 22 is placed on the depression 173a. It should be noted that the space 178 has a minimum height for accommodating the tray 173 that holds thereon the optical disk 22.

As can be seen in FIG. 38(B), the optical disk 22 is accommodated in the depression 173a wherein the upper major surface of the disk 22 forms a substantially flush surface with an upper major surface of the tray 173. Thereby, one can reduce the overall thickness of the cartridge 170 to be smaller than the thickness $t_1$ of the conventional cartridge 1 of FIG. 2.

Figure 39:
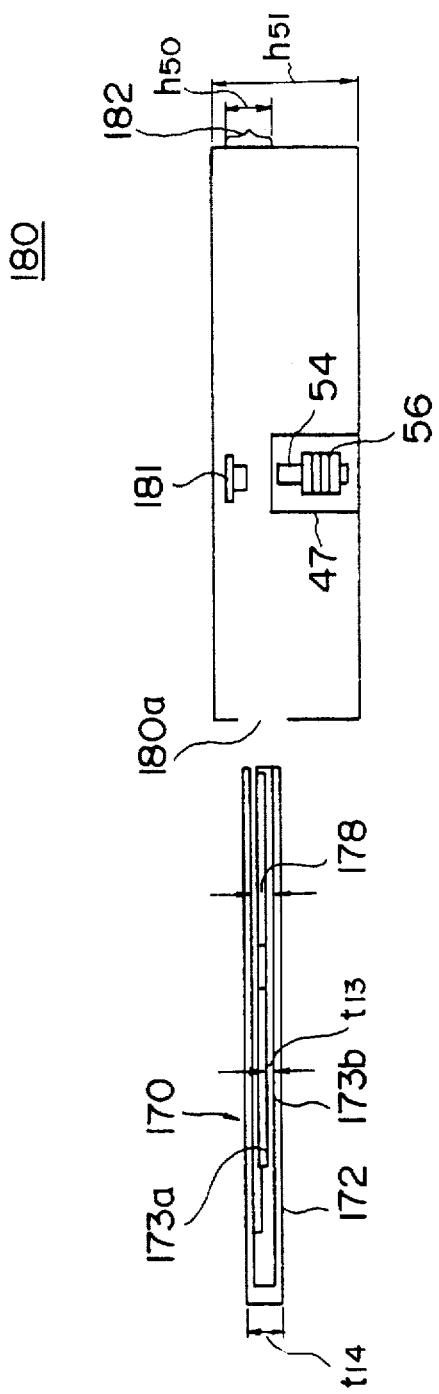
FIG. 39 is a diagram showing the cartridge of FIGS. 38(A) and 38(B) together with an optical disk drive that cooperates with the cartridge of FIG. 38(A) and 38(B) in a cross sectional view.

FIG. 39 shows the construction of an optical disk drive 180 that cooperates with the optical disk cartridge 170. In FIG. 39, it will be seen that the cartridge 170 has an overall thickness $t_{14}$.

Referring to FIG. 39, the optical disk drive 180 has an opening 180a covered by a lid for accepting the cartridge 170, wherein there is provided an electric magnet 181 at an upper part of the disk drive 180 in coincidence to the rotational axis of the spindle 47.

It should be noted that the disk drive 180 has a space 182 having a height $h_{50}$ for accommodating the cartridge 170, wherein the height $h_{50}$ corresponds to the thickness $t_{14}$ of the cartridge 170. As the thickness $t_{14}$ of the cartridge 170 is minimized, the height $h_{50}$ of the space 182 and hence the height $h_{51}$ of the optical disk drive 180 are minimized.

FIGS. 40(A)–40(E) show the loading operation of the optical disk 22 on the optical disk drive 180.

Referring to FIG. 40(A), the cartridge 170 is attached to the opening 180a, and the tray 173 is pulled out from the cartridge body 172 in the $X_1$-direction in the step of FIG. 40(B). Next, in the step of FIG. 40(C), the electric magnet 181 is energized and the hub 33 of the optical disk 22 is sucked up by the magnet 181. Further, the tray 173 is returned to the cartridge body 172 by moving the tray 173 in the $X_2$-direction. When the cartridge body 172 is detached from the optical disk drive 180, the electric magnet 181 is deenergized and the optical disk 22 falls upon the spindle 47. Thereby, the magnet 55 on the spindle holds the hub 33 of the optical disk 22.

FIGS. 41(A)–41(E) show the operation for removing the optical disk 22 from the optical disk drive 180.

Referring to FIG. 41(A), the solenoid 56 provided on the spindle 47 is energized at first and the pin 54 lifts up the the optical disk 22 in the vicinity of the hub 33 in the upward direction such that the magnetic engagement between the hub 33 and the permanent magnet 55 on the spindle 47 is broken. Simultaneously, the electric magnet 181 is energized and the optical disk 22 is sucked up by the magnet 181.

Next, the blank cartridge body 172 of the optical disk cartridge 170 is attached to the opening 180a of the disk drive 180 as indicated in FIG. 41(B), and the tray 173 is drawn out from the cartridge body 178 as indicated in FIG. 41(C). Further, in the step of FIG. 41(D), the magnet 181 is deenergized and the optical disk 22 falls upon the tray 173 and accepted by the depression 173a. Further, in the step of FIG. 41(E), the tray 173 is retracted into the cartridge body 172.

Figure 42A:
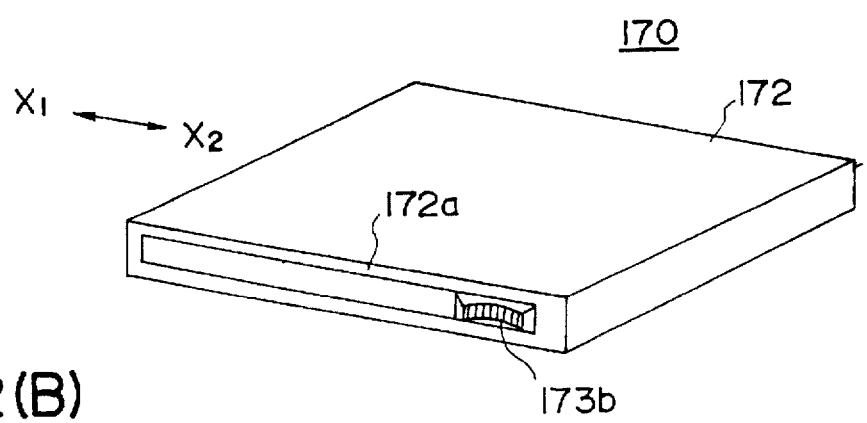
FIGS. 42(A) and 42(B) are diagrams showing the mechanism for actuating the optical disk cartridge of the fifth embodiment to cause the loading and unloading operation of FIGS. 40(A)–40(E) and 41(A)–41(E)
Figure 42B:
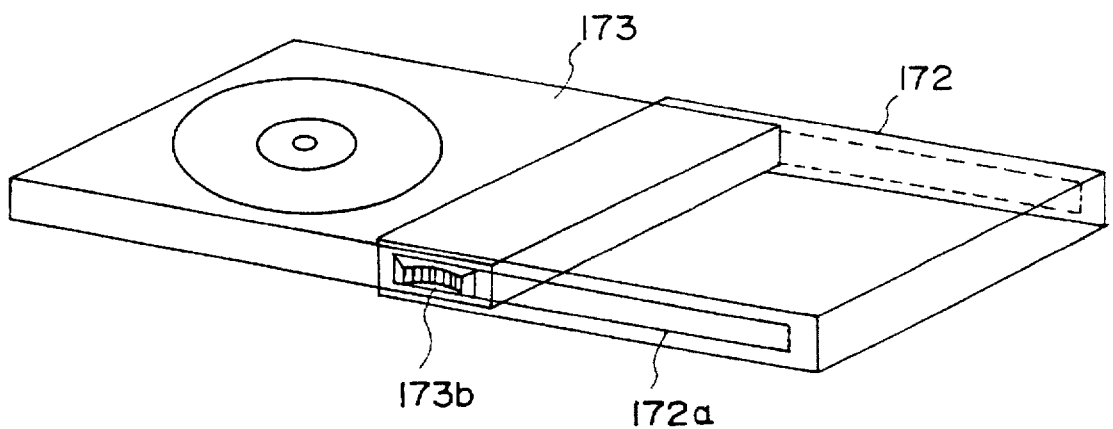

FIGS. 42(A) and 42(B) are the diagrams showing the cartridge 170 in a plan view.

Referring to FIG. 42(A), it will be noted that the cartridge body 172 is provided with an elongate cutout 172a on the side wall thereof to extend in the $X_1$–$X_2$ direction, and the tray 173 carries a knob 173b such that the knob 173b moves through the cutout 172a in the $X_1$–$X_2$ direction. Thus, when the tray 173 is to be drawn out from the cartridge body as in the step of FIG. 40(B) or 40(C), the user actuates the knob 173b manually to move in the $X_1$-direction. Similarly, when the tray 173 is to be retracted into the cartridge body 170, the user actuates the knob 173b manually to move in the $X_2$-direction.

Figure 43:
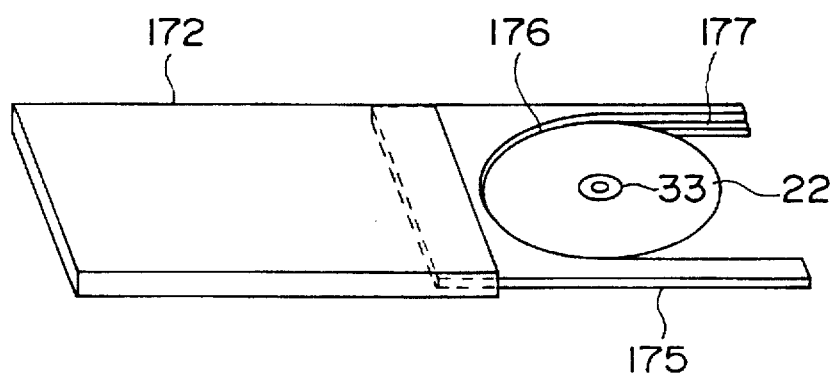
FIG. 43 is a diagram showing a modification of the cartridge of FIGS. 38(A) and 38(B)

FIG. 43 shows a modification of the cartridge 170 wherein the cartridge 170 has a tray 175 that is provided with a U-shaped cutout 176. The U-shaped cutout 176 is formed with a marginal part 177 having a level lower than the upper major surface of the tray 175, and the optical disk 22 is held upon the marginal part 177 such that the upper major surface of the optical disk 22 is substantially flush with the upper major surface of the tray 175.

Figure 44A:
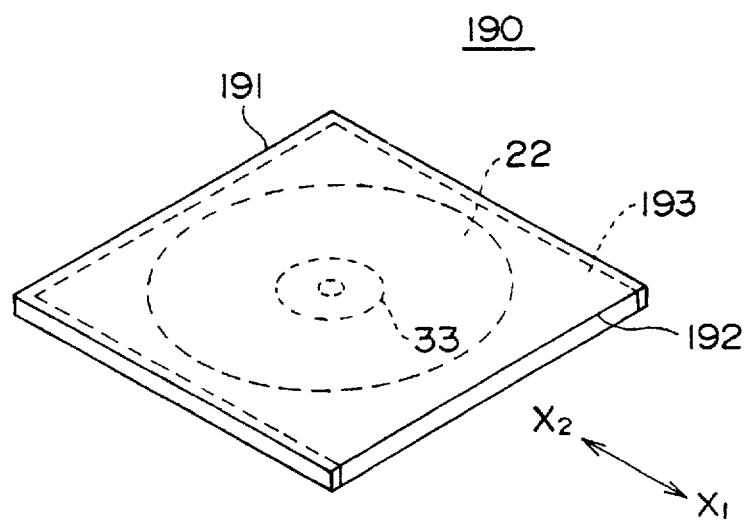
FIGS. 44(A) and 44(B) are diagrams showing the optical disk cartridge according to a sixth embodiment in a perspective view.
Figure 44B:
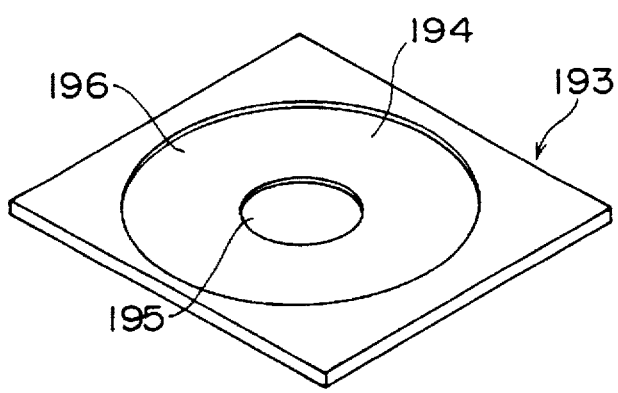

Next, a sixth embodiment of the present invention will be described with reference to FIGS. 44(A) and 44(B), wherein FIG. 44(A) shows an optical disk cartridge 190 of the present embodiment in a perspective view while FIG. 44(B) shows a tray 193 that is accommodated in the cartridge 190 for holding the optical disk 22.

Referring to FIG. 44(B), it will be noted that the tray 193 has a generally rectangular or square shape and is formed with a shallow depression 194 of circular shape having a size corresponding to the size of the optical disk 22, and there is provided a circular cutout in the depression 194 in correspondence to the hub 33 of the optical disk 22 that is accommodated in the depression. The depression 194 has a depth, with respect to the upper major surface of the tray 193, that is substantially equal to the thickness of the optical disk 22 held in the depression 194. The tray 193 is covered by a cartridge body 191 as indicated by a broken line, wherein the cartridge body 191 covers the top part of the tray 193 as well as lateral edges except for an edge 192. The tray 193 is exposed at the edge 192 and can be taken out from the cartridge body 192 by pulling out in the $X_1$-direction.

Figure 45:
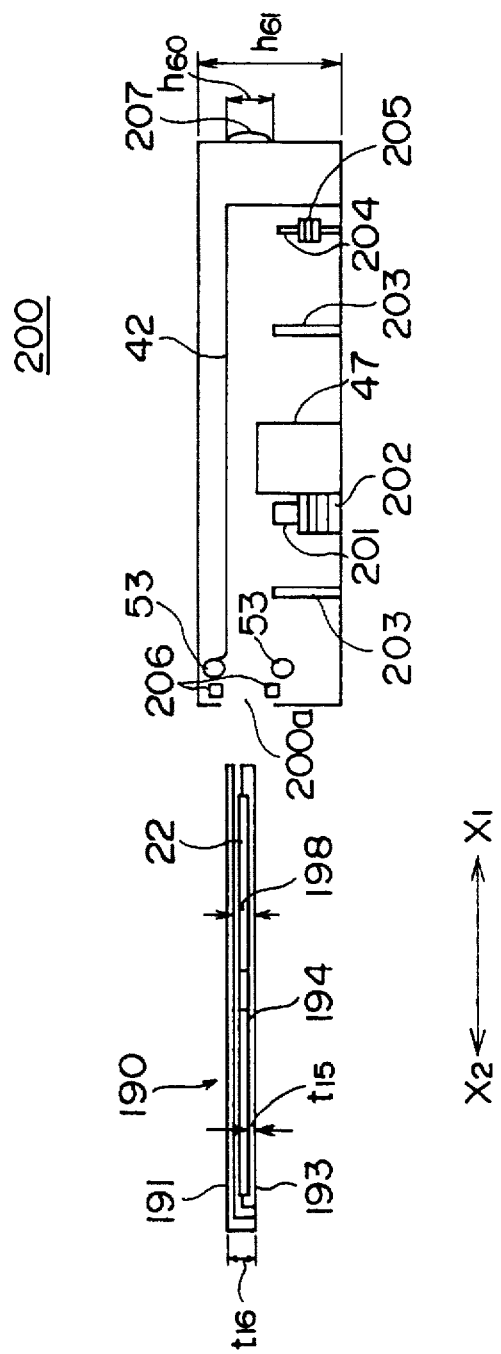
FIG. 45 is a diagram showing the cartridge of FIGS. 44(A) and 44(B) together with an optical disk drive that cooperates with the cartridge of FIGS. 44(A) and 44(B) in a cross sectional view.

FIG. 45 shows the optical disk cartridge 190 together with an optical disk drive 200 that cooperates with the cartridge 190. As indicated in FIG. 45, the cartridge 190 is defined with a space 198 for accommodating the optical disk 22, wherein the tray 193 has a reduced thickness $t_{15}$ in correspondence to the depression 194 for accommodating the disk 22. Thereby, the cartridge 190 has a total thickness $t_{16}$ that is substantially reduced as compared with the thickness $t_1$ of FIG. 2. Associated with the reduced total thickness $t_{16}$ of the cartridge 190, the space 207 for accommodating the cartridge 190 in the optical disk drive 200 has a reduced height $h_{60}$. Thereby, the optical disk drive 200 has also a reduced height as indicated by $h_{61}$.

In the optical disk drive 200, there is provided a guide member 42 corresponding to the guide member 42 of FIG. 5, and the guide rollers 53 accept the cartridge 190. Thereby, the cartridge 190 thus inserted into the opening 200a of the disk drive 200 is guided by the guide rollers 53 as well as by the guide member 42 and pushed in the $X_1$-direction.

Further, the optical disk drive 200 includes, in addition to the spindle 47 described previously, a solenoid-actuated pin 201 that is actuated up and down by a solenoid 202, wherein the pin 201 is provided in the vicinity of the spindle 47. In addition, there is provided another solenoid-actuated pin 204 that is moved up and down by a solenoid 205. Further, pins 203 are provided for supporting the tray 193 in the device 200. In addition, sensors 206 are disposed in the vicinity of the opening 200a for detecting the insertion of the cartridge 190 into the optical disk drive 200.

Figure 46A:
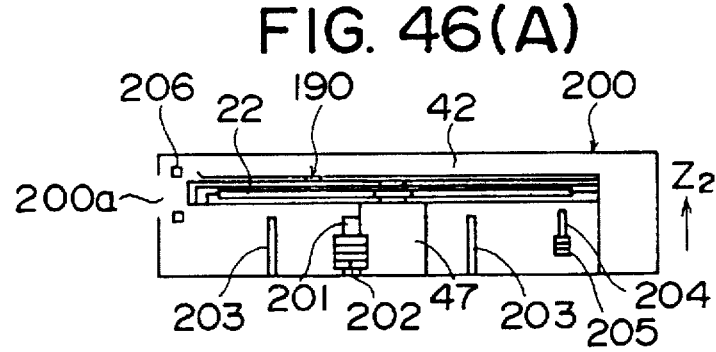
FIGS. 46(A)–46(C) are diagrams showing the loading of the optical disk on the optical disk drive of FIG. 45.

Next the loading operation of the cartridge 190 upon the optical disk drive 200 will be described with reference to FIGS. 46(A)–46(C), wherein FIG. 46(A) shows the state in which the cartridge 190 is accommodated in the drive 200.

In the state of FIG. 46(A), the sensors 206 detects the insertion of the cartridge 190 into the optical disk drive 200 and activates the solenoid 205 such that the pin 204 is moved upward. Thereby, the cartridge 190 inserted into the optical disk drive 200 is guided in the $X_1$-direction by the guide rollers 53 not shown in FIG. 46(A) as well as by the guide member 42 and is held horizontally by the spindle 47 as well as by the pin 203. In the state of FIG. 46(A), it should be noted that the spindle 47 engages with the hub 33 of the optical disk 22 via the opening 195 provided on the tray 193. Similarly to the previous embodiments, the spindle 47 is provided with a magnet for holding the hub 33 of the disk 22.

Figure 46B:
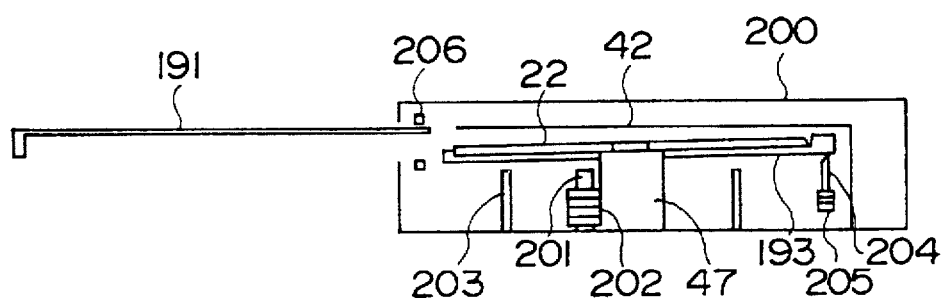
Figure 46C:
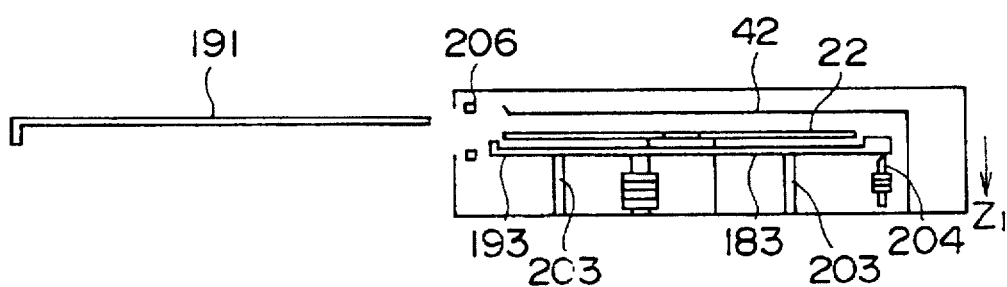

Next, in the state of FIG. 46(B), the cartridge body 191 is pulled out from the optical disk drive 200, leaving the tray 193 together with the optical disk 22 held thereon. When the tray 193 is removed from the optical disk drive 200 as indicated in FIG. 46(C), the removal of the tray 193 is detected by the sensor 205 and the solenoid 205 is deenergized in response thereto. Thereby, the tray 193 is lowered in the $Z_1$-direction, separating from the optical disk 22, and the tray 193 thus lowered is held by the pins 203. Thereby, the optical disk 22 can be rotatable freely together with the spindle 47 in the optical disk drive 200.

Next, the process for removing the optical disk 22 away from the optical disk drive 200 will be described with reference to FIGS. 47(A)–47(D).

Figure 47A:
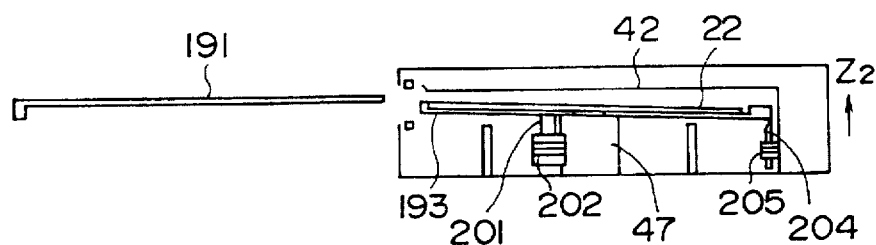
FIGS. 47(A)–47(D) are diagrams showing the unloading of the optical disk from the optical disk drive of FIG. 45.
Figure 47B:
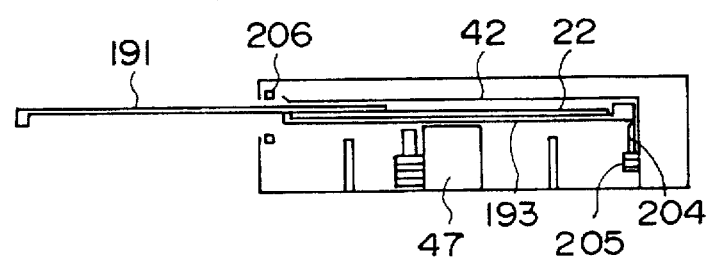
Figure 47C:
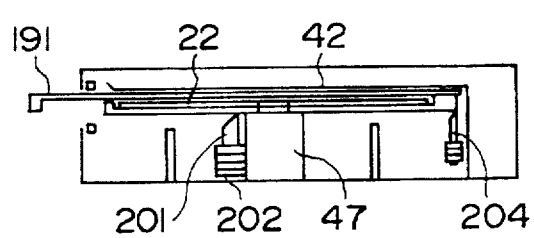
Figure 47D:
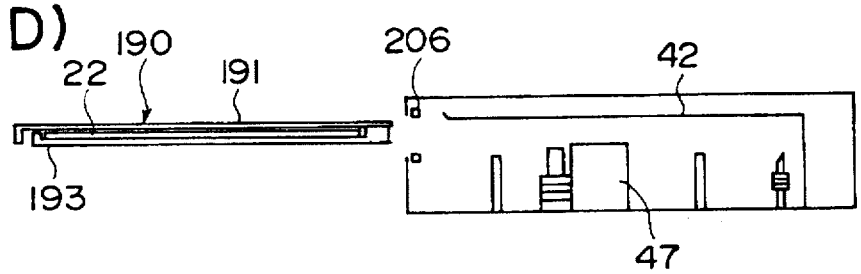

Referring to FIG. 47(A), the solenoid 202 is energized and the pin 201 is actuated to move in the upward direction indicated as $Z_2$-direction. Thereby, the tray 193 is held upward in an oblique state. Next, the solenoid 205 is activated and the pin 204 is moved in the upward direction in the step of FIG. 47(B). Thereby, the tray 193 recovers the horizontal state and the optical disk 22 held upon the spindle 22 is engaged with the depression 194 formed on the tray 193. In this state, the cartridge body 191 is inserted into the optical disk drive 200 through the opening 200a. With further insertion of the cartridge body 191 in the $X_1$-direction, the cartridge body 191 covers the tray 193 as indicated in FIG. 47(C). After the body 191 is fully inserted and engaged with the tray 193, the cartridge body 191 is pulled out in the $X_2$-direction as indicated in FIG. 47(D) and the optical disk 22 is pulled out together with the tray 193.

Next, the mechanism for releasing the engagement between the tray 193 and the cartridge body 191 and for resuming the engagement will be described with reference to FIGS. 48–50.

Figure 48:
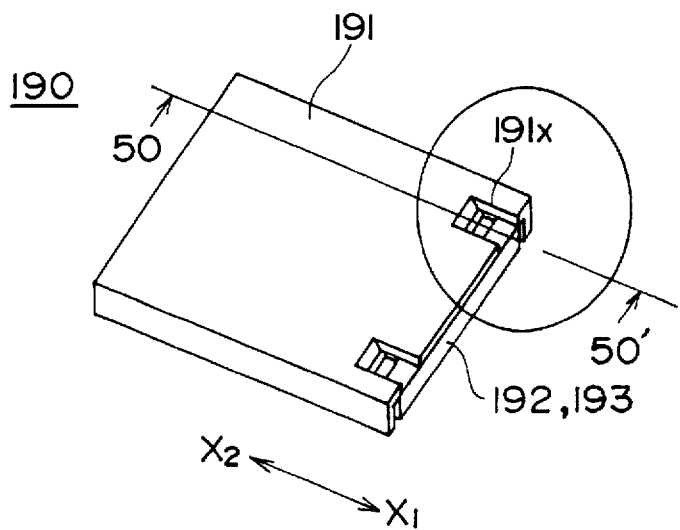
FIGS. 48–50 are diagrams showing the catching mechanism used in the optical disk of FIGS. 44(A) and 44(B)
Figure 49:
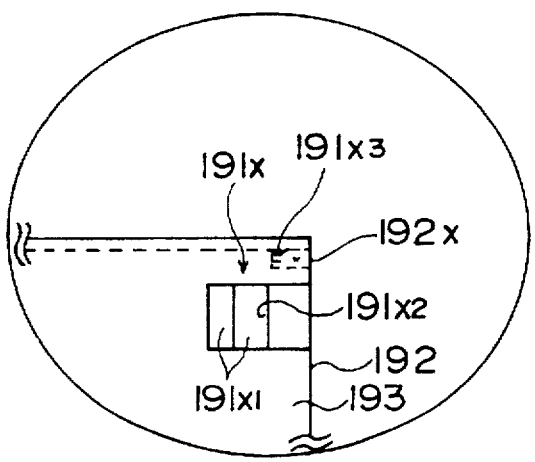
Figure 50:
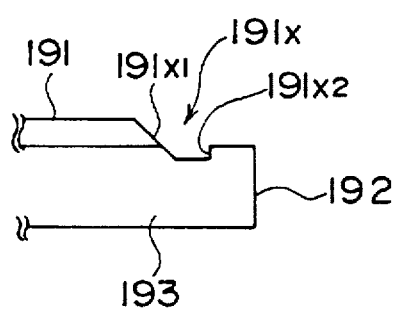

FIG. 48 corresponds to the perspective view of FIG. 44(A) and shows a catching mechanism 191x that is used for catching the tray 193 in the step of FIG. 46(B) for holding the tray 193 inside the optical disk drive 200, wherein FIG. 49 shows the catching mechanism 191x in a plan view with an enlarged scale. Further, FIG. 50 shows the catching mechanism 191x in a cross sectional view taken along a line 50–50' of FIG. 48.

Referring to the cross sectional view of FIG. 50, it will be noted that the cartridge 190 is provided with a slope $191x_1$ adjacent to the edge 192 for guiding a hook member provided on the optical disk drive 200 as will be described later, and a step $191x_2$ is formed in the tray 193 in correspondence to a part located adjacent to the slope $191x_1$ for engaging with the hook member. While the slope $191x_1$ extends over the cartridge body 191 and the tray 193, it should be noted that the step $191x_2$ is provided explicitly upon the tray 193. Further, the cartridge body 191 is formed with a projection $191x_3$ on the lateral wall thereof, and the projection $191x_3$ engages with a corresponding engaging part $192x$ when the cartridge body 191 covers the tray 193 properly.

Figures 51A, 51B, 51C:
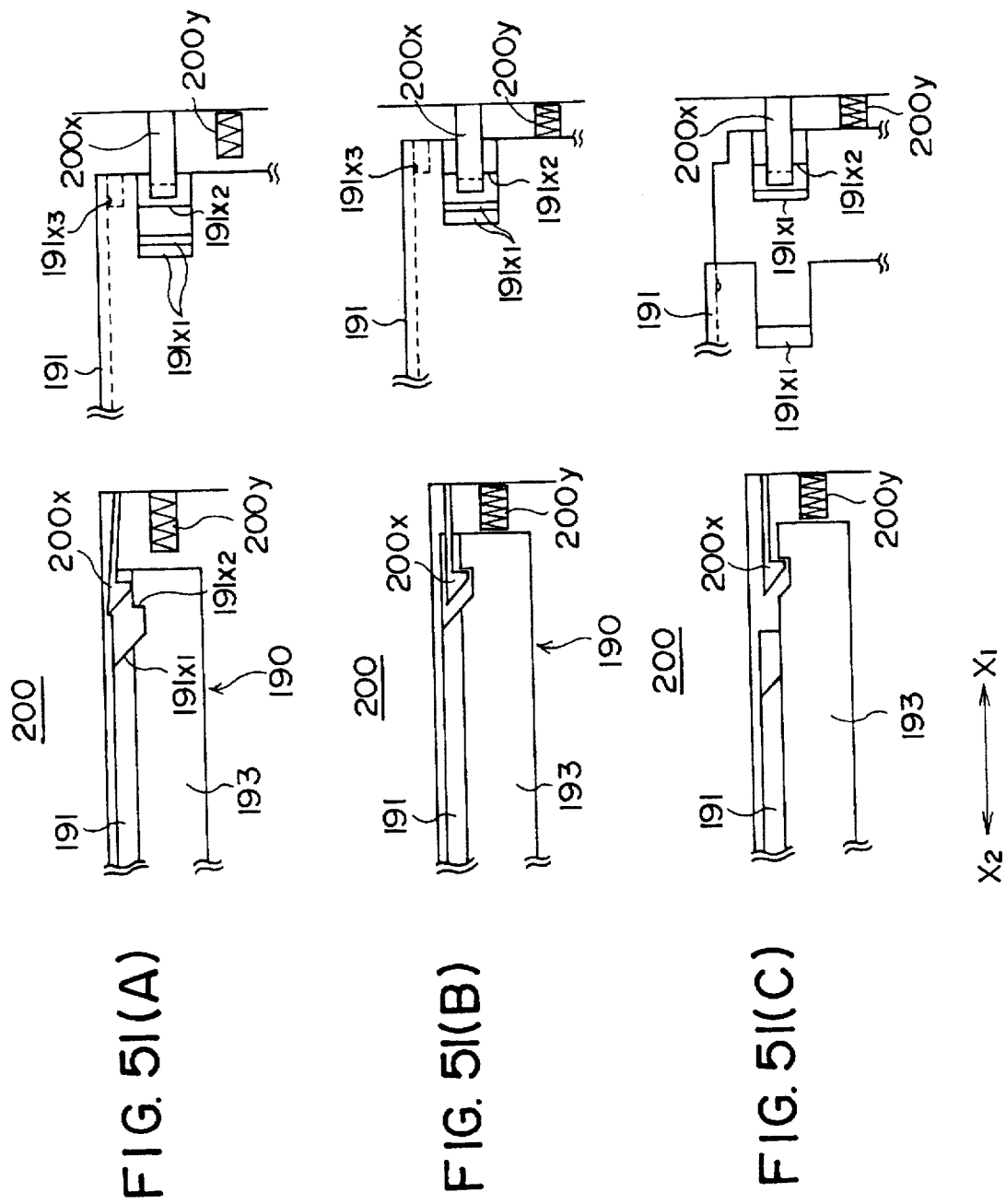
FIGS. 51(A)–51(C) are diagrams showing the catching of the optical disk in the loading process of FIGS. 46(A)–46(C)

FIGS. 51(A)–51(C) show the loading of the optical disk 22 upon the disk drive 200. Thus, the drawings correspond to the process of FIGS. 46(A)–46(C). In FIGS. 51(A)–51(C), the left drawings represent a cross sectional view, while the right drawings represent a plan view.

Referring to FIG. 51(A), there is provided a hook member 200x at the rear part thereof and the hook member is lifted up as the optical disk cartridge 190 is inserted in the $X_1$-direction. Further, there is provided a spring 200y adjacent to the hook member 200x for engagement with the tray 193 of the cartridge 190 when the cartridge 190 is loaded. With further insertion of the cartridge 190 in the $X_1$-direction as indicated in FIG. 51(B), the spring 200y is compressed and the hook member 200x engages with the step $191x_2$ of the catching member 191x. In this state, the tray 193 is firmly held by the hook member 200x. Thus, the tray 193 remains within the optical disk drive 200 when the cartridge body 191 is pulled out in the $X_2$-direction as indicated in FIG. 51(C).

FIGS. 52(A)–52(D) show the unloading of the optical disk from the optical disk drive 200. Similarly to FIGS. 51(A)–51(C), the left drawings represent the cross sectional view, while the right drawings represent the plan view.

Figure 52A:
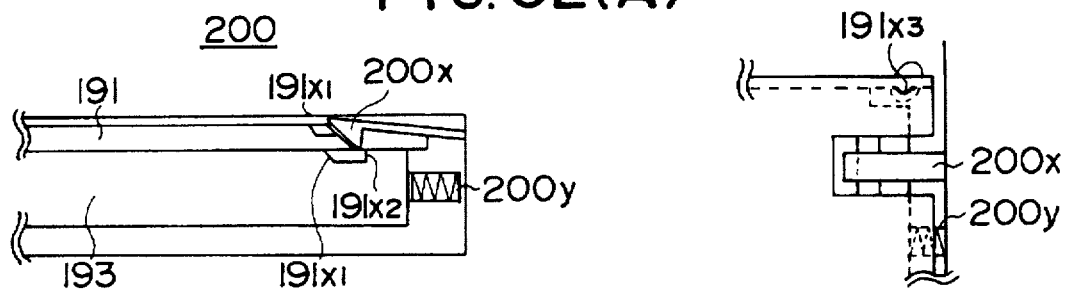
FIGS. 52(A)–52(D) are diagrams showing the release of catching of the optical disk in the unloading process of FIGS. 47(A)–47(D)
Figure 52B:
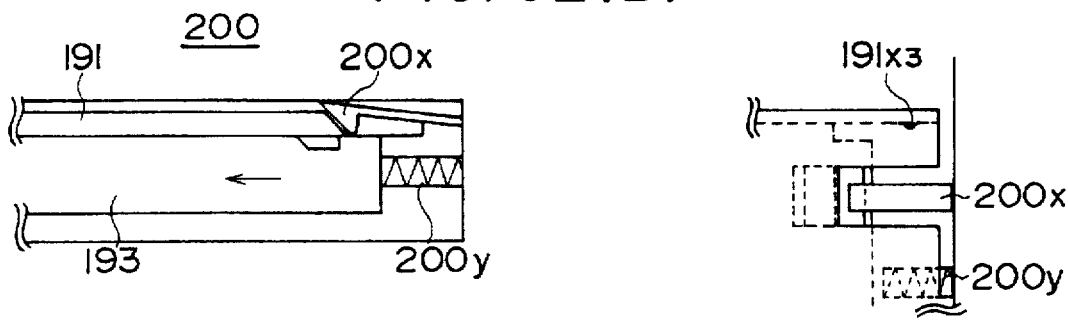
Figure 52C:
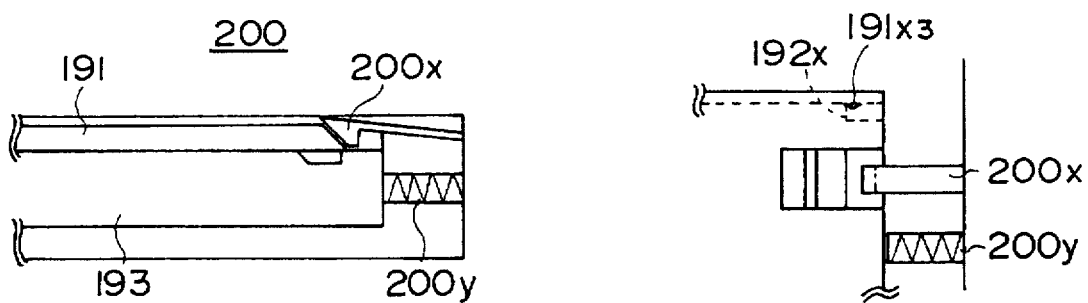
Figure 52D:
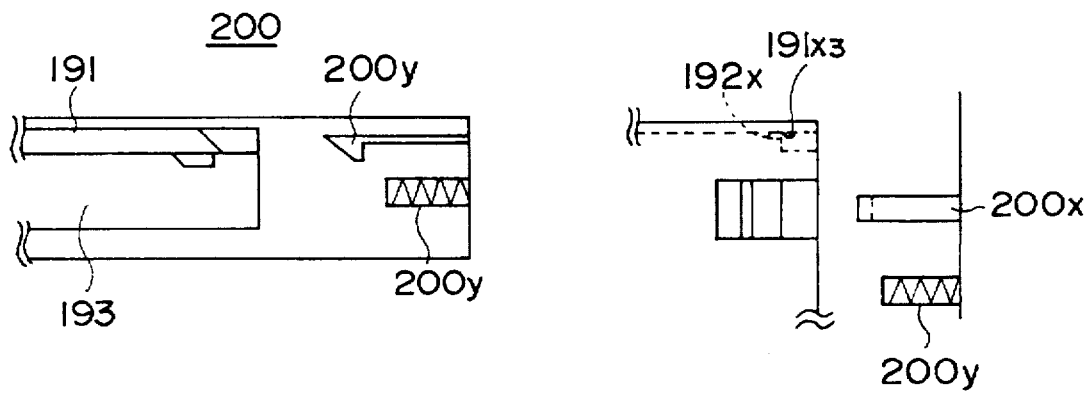

In the step of FIG. 52(A), the cartridge body 191 is inserted in the $X_1$-direction. Thereby, the slope $191x_1$ on the cartridge body 191 engages with a corresponding slope of the hook member 200x and the hook member 200x is urged in the upward direction. Thereby, the engagement between the hook member 200x and the step $191x_2$ of the tray 193 is released, and the tray 193 is pushed in the $X_2$-direction as a result of the urging force exerted by the spring 200y. Next, in the step of FIG. 52(C), the cartridge body 191 is pulled in the $X_2$-direction. Thereby, the projection $191x_3$ on the lateral wall of the cartridge body 191 engages with the corresponding engaging part 192x, and further withdrawal of the cartridge body 191 in the $X_2$-direction causes the simultaneous movement of the tray 193 in the $X_2$-direction.

Next, a seventh embodiment of the present invention will be described with reference to FIG. 53 that shows an optical disk cartridge 210.

Figure 53:
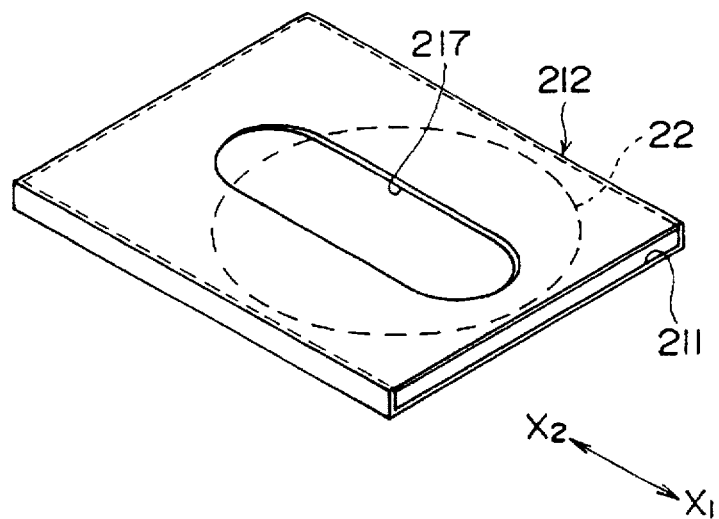
FIG. 53 is a diagram showing an optical disk cartridge according to a seventh embodiment of the present invention.
Figure 54:
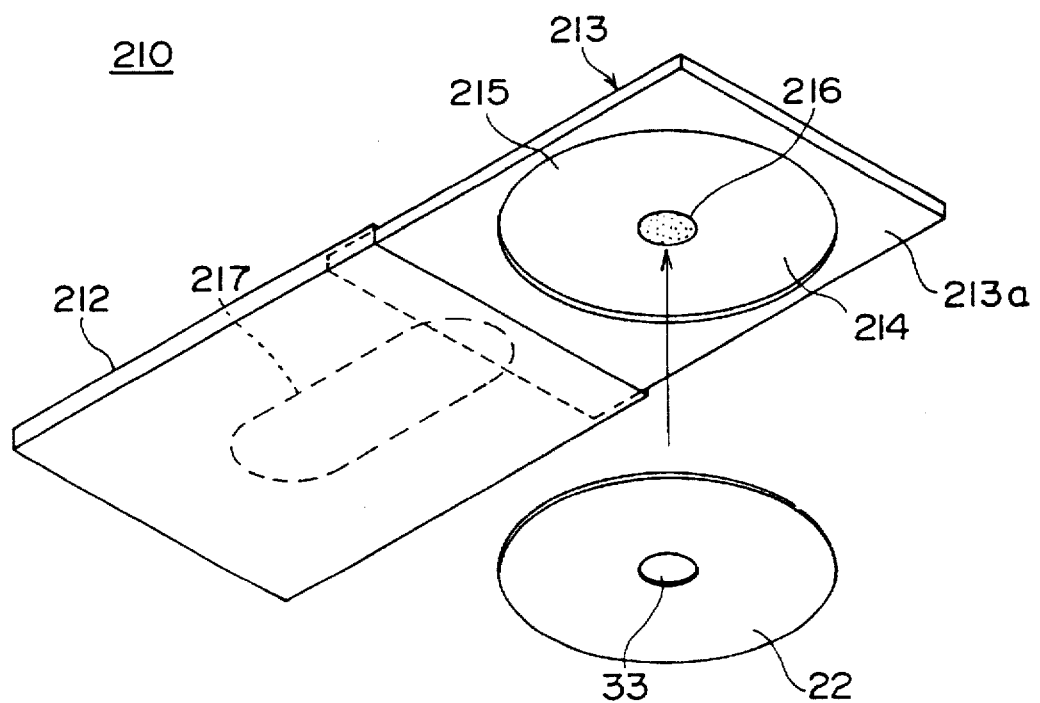
FIG. 54 is a diagram showing the optical disk cartridge in a state wherein a tray for holding an optical disk is pulled out.

Referring to FIG. 53, the optical disk cartridge 210 includes a square or rectangular cartridge body 212 having an opening 211 at an edge part thereof, and the cartridge body 212 includes a space 218 that accommodates a tray 213 such that the tray 213 is slidable to move in and out through the opening 211. The tray 213 is provided with a shallow, circular depression 214 in correspondence to a bottom surface 213a as indicated in FIG. 54, wherein the depression 214 is provided with a permanent magnet 216 at a central part of an upper major surface 215. The magnet 216 has a magnetism that is smaller than the magnetism of the magnet provided on the spindle 55. In addition, the cartridge body 212 is provided an elongate opening 217 on the upper major surface to extend in the $X_1$–$X_2$ direction, wherein the opening 217 has a size for allowing the user to actuate the tray 213 with respect to the cartridge body 212 by a finger.

In the cartridge 210, the magnet 216 attracts the hub 33 of the optical disk 22 and the optical disk 22 is thereby held within the depression 214. Thereby, the optical disk 22 is held in the tray 213.

Figure 55:
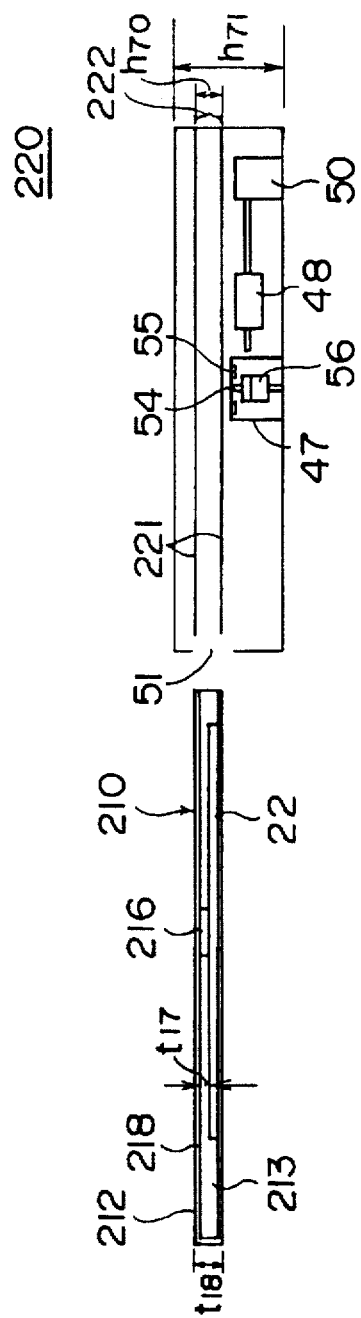
FIG. 55 is a diagram showing the optical disk cartridge of FIG. 54 together with an optical disk drive that cooperates with the optical disk cartridge of FIG. 54.

In the cartridge 220, it should be noted that a space 218 is formed within the cartridge 212 with a minimum height $t_{17}$ for accommodating the tray 213 in the state that the optical disk 22 is held upon the tray 213 as indicated in FIG. 55, and the cartridge 210 thereby has a minimum thickness $t_{18}$.

FIG. 55 also shows an optical disk drive 220 that cooperates with the optical disk cartridge 210. Similarly to the embodiments described previously, the optical disk drive 220 includes the spindle 47 carrying thereon the magnet 55, the solenoid-actuated pin 54, the solenoid 56 for actuating the pin 54, the optical head 48, and the optical detector 50. The cartridge 210 is inserted into the drive 220 along guide members 221.

FIGS. 56(A)–56(D) show the loading operation of the optical disk cartridge 210 upon the optical disk drive 220.

Figure 56A:
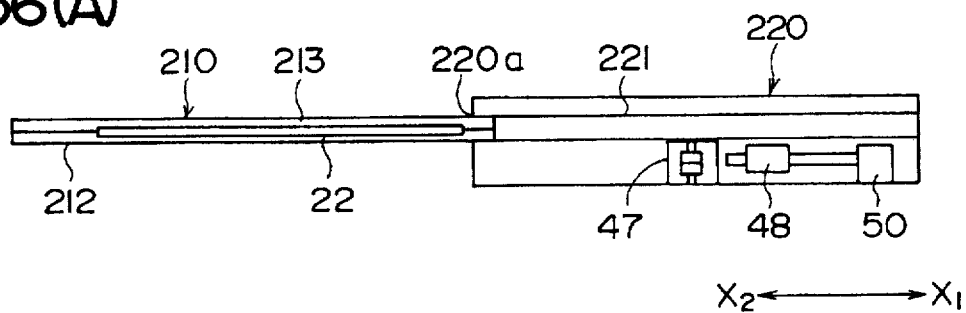
FIGS. 56(A)–56(D) are diagrams showing the loading of the optical disk on the optical disk drive of FIG. 55.
Figure 56B:
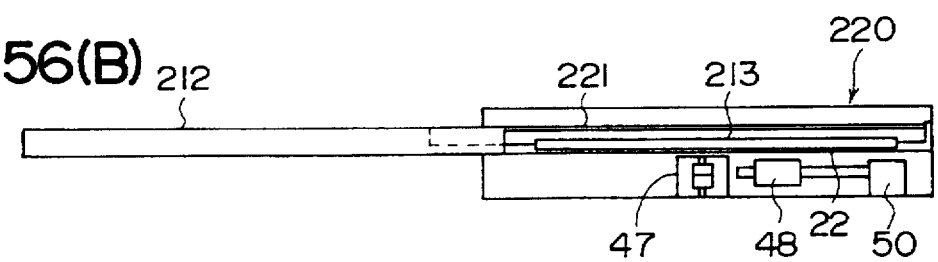
Figure 56C:
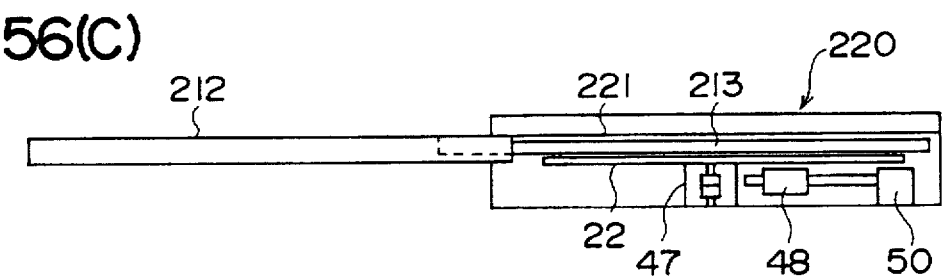
Figure 56D:
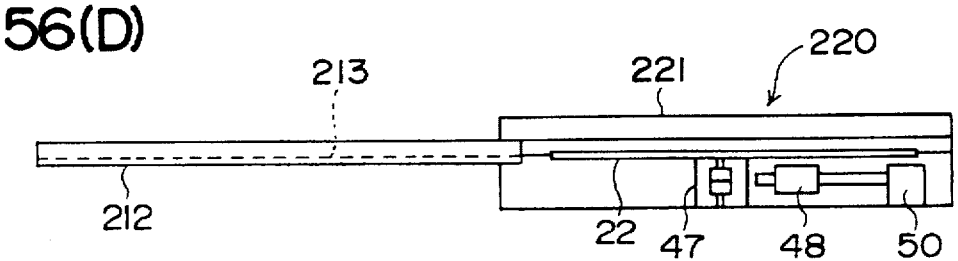

Referring to FIG. 56(A), the cartridge 210 is attached to an insertion opening 220a of the optical disk drive 220, and the user moves the tray 213 in the $X_1$-direction as indicated in FIG. 56(B) by the finger. When the tray 213 is inserted into the optical disk drive 220 a such, the optical disk 22 hitherto held upon the tray 213 by the magnet 216 is attracted by the magnet 55 on the spindle 47 and the optical disk 22 is mounted upon the spindle 47 as indicated in FIG. 56(C). It should be noted that the magnet 55 is a stronger magnet as compared with the magnet 216. Next, the tray 213 is moved in the $X_2$-direction and returned to the cartridge body 212 in the step of FIG. 56(D). Thereby, the optical disk 22 alone is left inside the optical disk drive 220 in engagement with the spindle 47.

FIGS. 57(A)–57(D) show the unloading of the optical disk 22 from the optical disk drive 220.

Figure 57A:
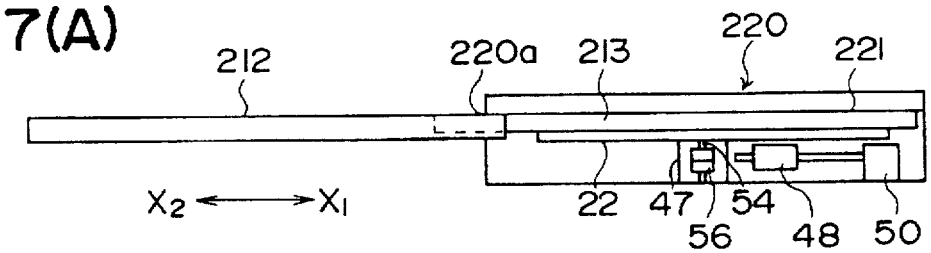
FIGS. 57(A)–57(D) are diagrams showing the unloading of the optical disk from the optical disk drive of FIG. 55.
Figure 57B:
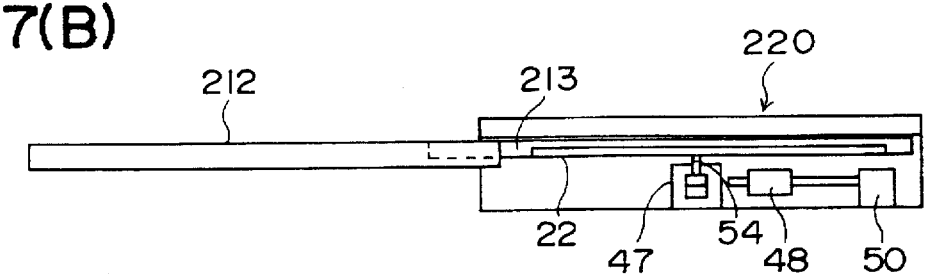
Figure 57C:
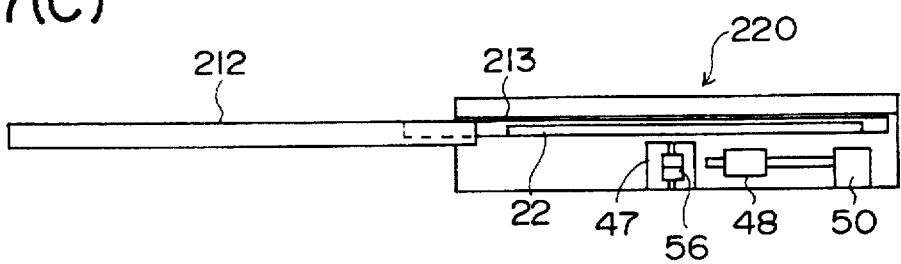
Figure 57D:
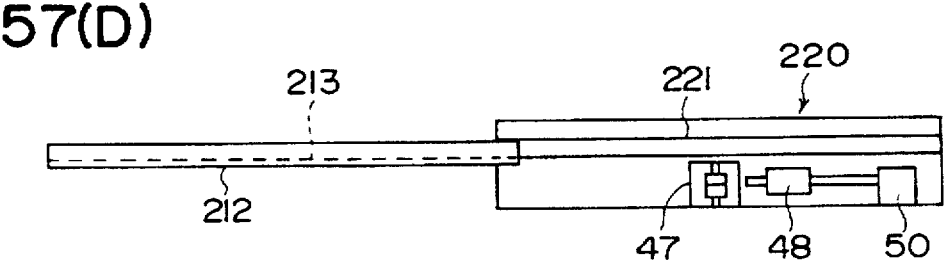

Referring to FIG. 57(A), the blank cartridge body 212 is attached to the opening 212a of the optical disk drive 220, and the tray 213 is moved in the $X_1$-direction in the step of FIG. 57(B) such that the tray 213 enters the disk drive 220. Further, the solenoid 56 is energized and the pin 54 is actuated such that the optical disk 22 is lifted up from the spindle 47. Thereby, the disk 22 is attracted by the magnet 216 on the tray 213, and the disk 22 is thereby held in the circular depression 214 on the tray 213 as indicated in FIG. 57(C). Next, in the step of FIG. 57(D), the tray 213 is moved in the $X_2$-direction together with the optical disk 22 and the tray 213 is returned to the cartridge body 212.

In the present embodiment, too, one can minimize the height $h_{71}$ of the optical disk drive 220 shown in FIG. 55 as a result of reduction in the height $h_{70}$ for the space 222 that accommodates the cartridge 210. As the thickness $t_{18}$ of the cartridge 210 is minimized, one can minimize the height $h_{70}$ and hence the height $h_{70}$.

Further, the present invention is not limited to the embodiments described heretofore, but various variations and modifications may be made without departing from the scope of the invention.

What is claimed is:

1. An optical disk drive adapted for reading information from an optical disk that is accommodated in a cartridge in a state removable therefrom, said optical disk drive comprising:

guide means for guiding said cartridge upon loading on said optical disk drive;

a lid member provided on said cartridge which is resiliently movable inward, said lid member covering an opening in said cartridge;

lateral catching means for selectively catching said optical disk upon loading of said cartridge on said optical disk drive such that said cartridge can be removed selectively and freely from said optical disk drive, wherein said lateral catching means comprises a pair of rods provided so as to laterally engage with said optical disk and an actuation mechanism that urges said rods into engagement with said optical disk when actuated in response to a loading of said optical disk cartridge upon said optical disk drive, said rods being provided so as to enter into said opening by pushing open said lid member of said optical disk cartridge upon loading of said optical disk cartridge on said disk drive and such that said rods engage with opposite edges of a circumference of said optical disk when said actuation mechanism is actuated;

driving means for causing said optical disk to revolve within said optical disk drive; and optical head means for reading information from said optical disk by means of a finely focused optical beam.

2. An optical disk drive as claimed in claim 1, wherein said actuation mechanism includes: a pair of slidable members connected rigidly to said pair of rods respectively and urged resiliently to approach with each other, each of said slidable members being formed with a stopper part; and a stopper mechanism urged to a first position for engagement with said stopper part of said slidable members for preventing the same from approaching each other, said stopper mechanism being movable to a second position, upon engagement with said optical disk cartridge when said optical disk cartridge is loaded on said optical disk drive, wherein said engagement between said stopper mechanism and said stopper part for preventing said slidable members to approach with each other is canceled when said stopper mechanism is in said second position.

3. An optical disk drive as claimed in claim 1, wherein said optical disk drive further includes an elevating mechanism for moving said optical disk together with said rods in said optical disk drive vertically with respect to a major surface of said optical disk.

* * * * *